United States Patent
Matsufuji et al.

(10) Patent No.: US 6,686,031 B2
(45) Date of Patent: Feb. 3, 2004

(54) HARD COAT FILM AND DISPLAY DEVICE HAVING SAME

(75) Inventors: Akihiro Matsufuji, Odawara (JP); Kiyokazu Hashimoto, Odawara (JP); Tsukasa Yamada, Minamiashigara (JP); Kenichiro Hatayama, Minamiashigara (JP); Yuuzou Muramatsu, Kaisei-machi (JP)

(73) Assignee: Fuji Photo Film Co., Ltd., Ninamiashigara (JP)

(*) Notice: Subject to any disclaimer, the term of this patent is extended or adjusted under 35 U.S.C. 154(b) by 0 days.

(21) Appl. No.: 09/789,499

(22) Filed: Feb. 22, 2001

(65) Prior Publication Data

US 2002/0018886 A1 Feb. 14, 2002

(30) Foreign Application Priority Data

| Feb. 23, 2000 | (JP) | 2000-046551 |
| Feb. 29, 2000 | (JP) | 2000-057973 |
| Mar. 10, 2000 | (JP) | 2000-072443 |
| Mar. 17, 2000 | (JP) | 2000-077097 |

(51) Int. Cl.$^7$ ................................................. B32B 7/02
(52) U.S. Cl. ........................................................ 428/212
(58) Field of Search ............................... 428/212, 213, 428/215, 216, 217, 323, 328, 329, 330, 331, 480, 402, 403, 404, 421, 446, 447; 359/601

(56) References Cited

U.S. PATENT DOCUMENTS

| 4,310,600 A | 1/1982 | Cross |
| 4,624,971 A | 11/1986 | van Tao et al. |
| 4,801,640 A | 1/1989 | Dallmann et al. |
| 5,104,929 A * | 4/1992 | Bilkadi ........................ 524/847 |
| 5,322,888 A * | 6/1994 | Kato et al. ................... 524/783 |
| 5,789,476 A * | 8/1998 | Iryo et al. .................... 524/430 |
| 5,858,077 A * | 1/1999 | Kayanoki ............... 106/287.11 |
| 6,358,601 B1 * | 3/2002 | Bilkadi ........................ 428/323 |

FOREIGN PATENT DOCUMENTS

| EP | 0 200 452 A2 * | 11/1986 |
| JP | 05-164903 A | 6/1993 |

OTHER PUBLICATIONS

Patent Abstracts of Japan, Publication No. 05–164903, dated Jun. 29, 1993, Kokubu Kenichi et al, "Composition for Hard Coating".

* cited by examiner

Primary Examiner—Vivian Chen
(74) Attorney, Agent, or Firm—Burns, Doane, Swecker & Mathis, LLP

(57) ABSTRACT

A hard coat film comprising; a transparent support; and a hard coat layer thereon; the hard coat layer containing surface-treated inorganic fine particles and a crosslinked binder polymer; the surface treatment being carried out using, as a surface treatment agent, an organic compound containing an anionic functional group or an organometallic compound; and the binder polymer being formed by crosslinking a radiation polymerizable compound. A display device is also disclosed wherein a hard coat film having antireflection properties is formed on the display surface thereof.

24 Claims, 3 Drawing Sheets

(a)

(b)

(c)

(d)

HARD COAT FILM AND DISPLAY DEVICE HAVING SAME

The present application claims priority under 35 USC 119 on Japanese patent applications No. 2000-046551, filed on Feb. 23, 2000, No. 2000-057973, filed on Feb. 29, 2000, No. 2000-072443, filed on Mar. 10, 2000, and No. 2000-077097, filed on Mar. 17, 2000, which are herein incorporated by reference.

BACKGROUND OF THE INVENTION

1. Field of the Invention

The present invention relates to a hard coat film and a display device having same.

2. Description of the Related Art

Antireflection films are provided on various types of display device such as liquid crystal displays (LCDs), plasma display panels (PDPs), electroluminescent displays (ELDs) and cathode ray tube displays (CRTs).

With regard to the antireflection films, films having a structure in which a transparent film of a metal oxide is applied on a transparent support are used in the art. Antireflection films formed by applying a plurality of transparent films are used for preventing the reflection of light having various wavelengths. A transparent film of a metal oxide can be formed by a chemical vapor deposition (CVD) or physical vapor deposition (PVD) method. It is usually formed by a vacuum vapor deposition method which is one of the physical vapor deposition methods. A multi-layer vapor deposition film made from metal oxide has excellent optical properties as an antireflection film. Methods of forming antireflection films by vapor deposition are described in Japanese Patent Application Laid-open Nos. 60-144702, 61-245449, 62-178901 and 9-197103.

A method of forming an antireflection film by coating instead of vapor deposition has also been proposed. Although the coating method is slightly inferior to the vapor deposition methods in terms of the optical performance, it is characterized by a simple production procedure and high productivity. The coating method involves coating optically functional layers (low refractive index layer, high refractive index layer, medium refractive index layer) on a transparent support so as to form an anti-reflection film. Methods of forming such an anti-reflection film by coating are described in Japanese Patent Publication No. 60-59250 and Japanese Patent Application Laid-open Nos. 59-50401, 2-245702, 5-13021, 8-110401 and 8-179123.

In both the method of forming optically functional layers by vapor deposition and the method of forming optically functional layers by coating, a hard coat layer is usually formed on the transparent support prior to the formation of the optically functional layers. The hard coat layer functions to improve the abrasion resistance of the transparent support. The hard coat layer is therefore usually formed from a hard material such as a crosslinked binder polymer, and the binder polymer is often crosslinked after being applied as a layer.

However, this method often degrades the flatness when forming a hard coat layer so causing a problem in the formation of an antireflection film. Moreover, as the applications of antireflection films have diversified, the abrasion resistance of the current hard coat layers has become inadequate in some cases, and there is a desire for improvement of the abrasion resistance.

The hard coat film of the art is usually produced by forming a thin coating of about 3 to 15 $\mu$m directly or over a primer layer of about 1 $\mu$m on a transparent support film using a heat-curing type resin or a radiation polymerizable resin such as a UV-curing type resin.

On the other hand, TV Braun tubes, cathode ray tubes which are used as computer displays, plasma displays and field emission displays, to which a low reflection and conductive hard coat film has been applied, have the problems that the visibility is degraded by dust adhering to the face panel due to static electricity generated thereon, that electromagnetic radiation is emitted so affecting the surroundings badly, etc. Furthermore, accompanying the flattening of cathode ray tubes, etc. it has become necessary to introduce antireflection properties. Moreover, the face panel has the problem that it is easily abraded when touched by hand or cleaned.

Although a method of directly forming an electrically conductive layer on a face panel by vapor deposition, sputtering, etc. of a metal such as silver or an electrically conductive metal oxide such as ITO has been proposed from the viewpoint of preventing the generation of static electricity, shielding electromagnetic radiation and preventing reflection, since it requires a vacuum treatment or high temperature treatment to form the film, there are problems such as high production cost and poor productivity.

A method of forming an electrically conductive film by coating using the sol-gel method has also been proposed (Hanyu, et. al., National Technical Report 40, No. 1, (1994) 90), but this method has the problems that the required high temperature treatment might degrade the materials used as the transparent plastic film support or hard coat layer and the materials that can be used are therefore limited.

The use of a transparent electrically conductive coating in which fine particles or a colloid of an electrically conductive oxide are dispersed has also been proposed (Japanese Patent Application Laid-open Nos. 6-344489 and 7-268251), but there is the problem that the transparent electrically conductive layer so obtained has low conductivity.

In order to further enhance the conductivity, transparent electrically conductive films comprising metal particles have been proposed (Japanese Patent Application Laid-open Nos. 63-160140 and 9-55175). A method of forming a low reflection transparent electrically conductive film by applying an antireflection coating such as tetraethoxysilane on a transparent electrically conductive film has also been proposed (Japanese Patent Application Laid-open No. 10-142401). However, the following problems occur. That is to say, the mechanical strength is inadequate if metal particles alone are coated on a transparent support, an antireflection coating such as tetraethoxysilane requires a prolonged heat treatment at high temperature, the transparent supports that can be used are limited when applying an antireflection layer by the sol-gel method, and the above-mentioned method of forming a low reflection transparent electrically conductive film can only be used for direct application to a glass face panel.

Furthermore, an improvement in conductivity by coating fine silver particles directly onto a glass face panel by a spin coating method and calcining so as to cause a sintering reaction at around 150° C. and a decomposition reaction of $Ag_2O$ on the surface has been proposed (Japanese Patent Application Laid-open No. 10-66861), but this method also can also only be applied to a heat-resistant support such as glass.

Therefore, a method in which a preformed film is bonded to a support has been proposed (Taki, et. al., National Technical Report, 42, No. 3 (1996) 264-268), taking a different view from that of the method where a coating is formed directly on the front side of a face panel which requires high equipment cost and a high temperature treatment.

In the above-mentioned method of forming a film, an electrically conductive film is formed by vapor deposition, sputtering, etc. of an electrically conductive metal oxide such as ITO, and the film formation requires a vacuum treatment so increasing the production cost and degrading the productivity.

BRIEF SUMMARY OF THE INVENTION

It is a first object of the present invention to provide a hard coat film and an antireflection film in which shrinkage of the hard coat layer due to crosslinking of the binder polymer is suppressed and deformation is reduced, and also to provide a hard coat film and an antireflection film having excellent abrasion resistance by improving the mechanical properties of the hard coat layer.

It is a second object of the present invention to provide a hard coat film having a hardness of at least 4H in a pencil hardness test by suppressing degradation of the hardness of a radiation cured film due to deformation of the transparent support film.

It is a third object of the present invention to provide a low reflection electrically conductive hard coat film having excellent antistatic properties, electromagnetic radiation shielding properties, antireflection properties, mechanical characteristics and anti-contamination properties as well as high productivity which can be bonded to a face panel.

A first aspect of the present invention relates to a hard coat film comprising a hard coat layer on a transparent support, the hard coat layer containing surface-treated inorganic fine particles and a crosslinked binder polymer, wherein the surface treatment is carried out using an organic compound as a surface treatment agent, and the binder polymer is obtained by crosslinking a polyfunctional acrylate compound.

A second aspect of the present invention relates to a hard coat film which is superimposed by a layer of a radiation polymerizable resin on at least one side of a transparent support film, wherein the support film is a polyester film with at least one side thereof having a modulus of surface elasticity of 5 GPa to 15 GPa.

A third aspect of the present invention relates to a low reflection electrically conductive hard coat film comprising, on a transparent support, a hard coat layer, a transparent electrically conductive layer containing particles made of at least one type of metal and a transparent covering layer formed outside the transparent electrically conductive layer having a refractive index different from that of the transparent electrically conductive layer, wherein the transparent covering layer contains a polymer derived from a compound comprising mainly a radiation polymerizable polyfunctional monomer and polymerizable compound having a perfluoroalkyl group.

A fourth aspect of the present invention relates to a low reflection electrically conductive hard coat film having, on a transparent support, a hard coat layer comprising inorganic fine particles and the crosslinked form of a polymerizable polyfunctional compound, a transparent electrically conductive layer containing particles made of at least one type of metal, at lease one transparent antireflection layer formed outside the transparent electrically conductive layer having a refractive index different from that of the transparent electrically conductive layer, and an anti-contamination layer formed as the outermost layer. In this hard coat film, the transparent electrically conductive layer is preferably formed from a cured mixture of a radiation polymerizable compound and metal particles.

Still another aspect of the present invention relates to a display device in which a low reflection, an electrically conductive or a low reflection and electrically conductive hard coat film is provided on the display surface.

The low reflection electrically conductive hard coat film of the present invention has, on a transparent support, a hard coat layer, a transparent electrically conductive layer and a transparent antireflection layer, preferably in that order, but the present invention is not limited thereby; the order of the layers may be changed, an intermediate layer may be provided between the above-mentioned layers, or a layer having another function may be added. The respective layers may consist of more than one layer as necessary.

DETAILED DESCRIPTION OF THE INVENTION

Several embodiments of the hard coat film of the present invention are explained below from the viewpoint of the layer structure by reference to FIGS. 1 to 4.

Figure 1:
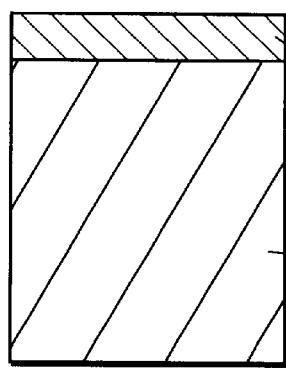
FIGS. 1(a)–(d) is a schematic diagram showing cross-sections of a hard coat film of various embodiments of the present invention, wherein a hard coat layer is provided on a transparent support.
Figure 1:
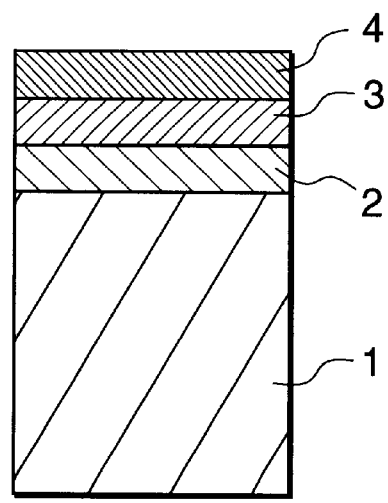
Figure 1:
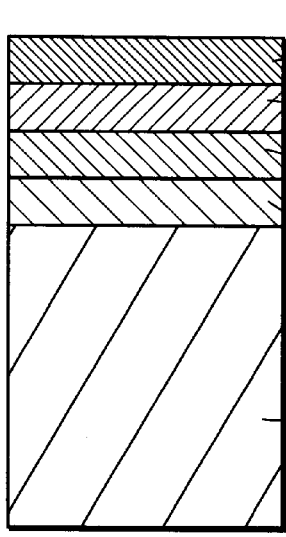
Figure 1:
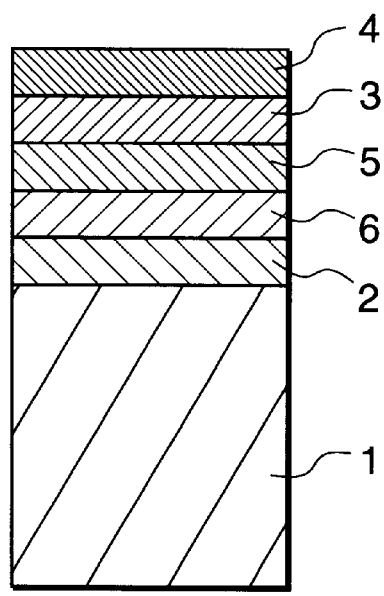

In FIG. 1, FIG. 1(a) is a schematic cross section of one example of a hard coat film comprising a hard coat layer 2 on a transparent support 1.

FIG. 1(b) is a schematic cross section of one example of an antireflection film comprising a hard coat layer 2, a low refractive index layer 3 and an overcoat layer 4 on a transparent support 1 wherein the following relationship is satisfied.

Refractive index of low refractive index layer<refractive index of transparent support FIG. 1(c) is a schematic cross section of one example of an antireflection film comprising a hard coat layer 2, a high refractive index layer 5, a low refractive index layer 3 and an overcoat layer 4 on a transparent support 1 wherein the following relationship is satisfied.

Refractive index of low refractive index layer<refractive index of transparent support<refractive index of high refractive index layer FIG. 1(d) is a schematic cross section of one example of an antireflection film comprising a hard coat layer 2, a medium refractive index layer 6, a high refractive index layer 5, a low refractive index layer 3 and an overcoat layer 4 on a transparent support 1 wherein the following relationship is satisfied.

Figure 2:
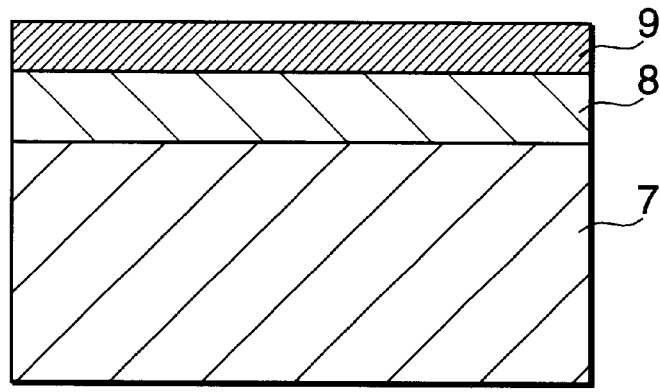
FIG. 2 is a schematic diagram showing a cross section of a hard coat film of another embodiment of the present invention, wherein the transparent support is formed by applying two types of transparent support.

Refractive index of low refractive index layer<refractive index of transparent support<refractive index of medium refractive index layer<refractive index of high refractive index layer FIG. 2 relates to one example of a transparent support film having a high modulus of surface elasticity and is a schematic cross section of one example of the hard coat film comprising a radiation cured resin layer 9 on the surface of a transparent support film comprising a transparent support (layer A) 7 and a transparent support (layer B) 8.

Figure 3:
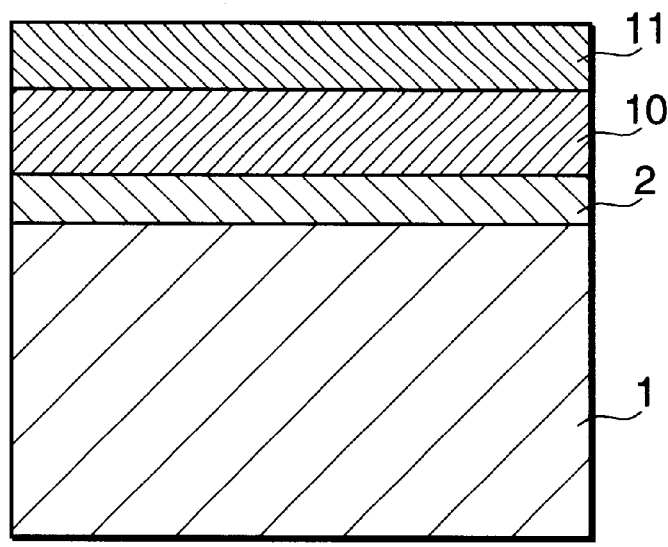
FIG. 3 is a schematic diagram showing a cross section of a hard coat film of still another embodiment of the present invention, which is a low reflection electrically conductive hard coat film having a transparent electrically conductive layer and an antireflection layer.

FIG. 3 is a schematic cross section of one example of a low reflection electrically conductive hard coat film comprising, on a transparent support 1, a hard coat layer 2, a transparent electrically conductive layer 10 made of metal particles and an anti-contamination transparent covering layer 11 which is formed outside the transparent electrically conductive layer 10 and has a refractive index different from that of the transparent electrically conductive layer. It is also possible to provide a further anti-contamination layer outside the anti-contamination transparent covering layer 11.

Figure 4:
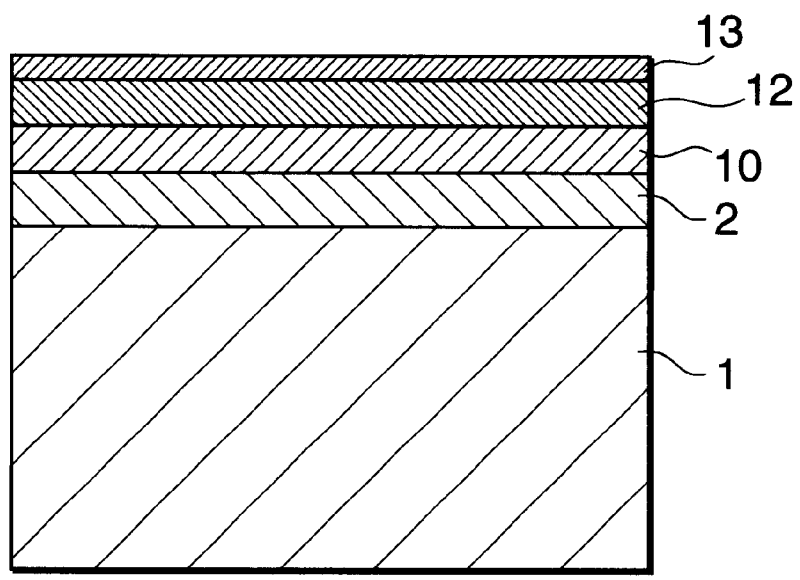
FIG. 4 is a schematic diagram showing a cross section of a hard coat film of still another embodiment of the present invention, which is a low reflection electrically conductive hard coat film having an anti-contamination layer as the outermost layer.

FIG. 4 is a schematic cross section of one example of a low reflection electrically conductive hard coat film having, on a transparent support 1, a hard coat layer 2, a transparent electrically conductive layer 10 made of particles comprising at least one type of metal, an antireflection layer 12 which is formed outside the transparent electrically conductive layer 10 and has a refractive index different from that of the transparent electrically conductive layer 10, and an anti-contamination layer 13 as the outermost layer.

In the multi-layer film related to the present invention the presence of the hard coat layer can prevent abrasion of the film, the presence of the transparent electrically conductive layer comprising metal particles can prevent the build-up of static electricity and effectively block the electromagnetic radiation emitted from a cathode ray tube, etc. and, further, the presence of the antireflection layer can decrease the reflection of external light, and at the same time the anti-contamination properties can improve the mechanical strength of the surface and prevent contamination of the film. Furthermore, contamination of the film can be prevented due to the presence of the anti-contamination layer as the outermost layer.

Each of the layers forming the hard coat film of the present invention is explained in detail below.

The hard coat film of the present invention is formed by providing a specified hard coat layer on a transparent support. It is preferable to use a plastic film as the transparent support, and more preferable to use a transparent support film comprising a polyester film, wherein at least one side thereof has a modulus of surface elasticity of 5 GPa to 15 GPa.

The hard coat film preferably comprises, on the hard coat layer, a medium refractive index layer having a refractive index which is higher than that of the transparent support, a high refractive index layer having a refractive index which is higher than either that of the transparent support or that of the medium refractive index layer, and a low refractive index layer having a refractive index which is lower than that of the transparent support in that order so as to introduce antireflection properties, and the hard coat film also preferably comprises, on the hard coat layer, a transparent electrically conductive layer, a transparent antireflection layer and an anti-contamination layer in that order so as to introduce conductivity and low reflection.

The transparent antireflection layer here comprises at least one layer which is formed outside the transparent electrically conductive layer and has a refractive index different from that of the transparent electrically conductive layer. The transparent antireflection layer is preferably a transparent covering layer containing a polymer derived from a compound mainly comprising a radiation polymerizable polyfunctional monomer and a compound having a perfluoroalkyl group.

The transparent support, hard coat layer, low, medium and high refractive index layers, hard coat film having antireflection properties, transparent electrically conductive layer, antireflection layer and anti-contamination layer which are characteristic components of the present invention are explained in detail below.

(Transparent Support)

With regard to the transparent support, it is desirable to use a plastic film. With regard to examples of polymers forming the plastic film, cellulose esters (e.g., triacetyl cellulose, diacetyl cellulose, propionyl cellulose, butyryl cellulose, acetyl propionyl cellulose, nitrocellulose), polyamides, polycarbonates, polyesters (e.g., poly(ethylene terephthalate), poly(ethylene naphthalate), poly(1,4-cyclohexanedimethylene terephthalate), polyethylene-1,2-diphenoxyethane-4,4'-dicarboxylate, poly(butylene terephthalate), polystyrenes (e.g., syndiotactic polystyrene), polyolefins (e.g., polypropylene, polyethylene, polymethylpentene), polysulfones, poly(ether sulfone), polyarylates, poly(ether imides), poly(methyl methacrylate) and poly(ether ketones) are included. Triacetyl cellulose, polycarbonates, poly(ethylene terephthalate) and poly (ethylene naphthalate) are preferred.

The light transmission of the transparent support is preferably at least 80%, and more preferably at least 86%. Furthermore, the transmission in the visible light range is preferably at least 80%. The haze of the transparent support is preferably 2.0% or below, and more preferably 1.0% or below. The refractive index of the transparent support is preferably in the range from 1.4 to 1.7.

The thickness of the transparent support is not particularly limited, and it may be chosen according to the purpose for which it will be used, but it is desirably 20 to 500 $\mu$m. When it is too thin the film strength is degraded, when it is too thick the stiffness increases and bonding becomes difficult in some cases, and it is preferably 50 to 200 $\mu$m, and more preferably 80 to 200 $\mu$m.

The transparent support may be colored or subjected to a vapor deposition treatment if required or may contain a UV absorbing agent. In order to improve the adhesion to a layer formed on the surface of the transparent support, either or both surfaces thereof can be subjected to a surface treatment by an oxidation method, a roughening method, etc. if desired. With regard to the above-mentioned oxidation method, for example, a corona discharge treatment, a glow discharge treatment, a chromic acid treatment (wet system), a flame treatment, a hot air treatment, an ozone or UV irradiation treatment, etc. can be cited.

With regard to the transparent support, a transparent support film having a high modulus of surface elasticity is preferred, and the transparent support film having a high modulus of surface elasticity is preferably a polyester film having a modulus of surface elasticity of 5 GPa to 15 GPa, more preferably 5.5 GPa to 12 GPa, and yet more preferably 6 GPa to 10 GPa.

The modulus of surface elasticity referred to in the present invention is the value determined using a micro indentation meter (Fischerscope H100VP-HCU, made by Fischer Instruments). In detail, the modulus of surface elasticity can be obtained by inserting a pyramidal diamond indenter (tip face angle; 136°) into a sample under a test load of F, measuring the insertion depth h of the indenter while decreasing the test load and determining the modulus of surface elasticity from the gradient between the insertion depths at loads of 90% and 60% of the load F. The measurement is repeated 10 times at 25° C. and 60% RH and the average is given as the value.

Such a polyester film can be produced as follows. The polyester is formed from a dicarboxylic acid and a diol, it is preferable that 50 mol % to 100 mol % of the entire dicarboxylic acid units is attributable to an aromatic dicarboxylic acid, it is more preferable that 70 mol % to 100 mol % of the entire dicarboxylic acid units is attributable to a naphthalenedicarboxylic acid and/or a phthalic acid, and it is yet more preferable that 80 mol % to 100 mol % of the entire dicarboxylic acid units is attributable to 2,6-naphthalenedicarboxylic acid and/or terephthalic acid. With regard to the diol, it is preferable that 50 mol % to 100 mol % of the entire diol units is attributable to ethylene glycol, more preferably 70 mol % to 100 mol %, and still more preferably 80 mol % to 100 mol %.

With regard to detailed preferred examples of the polyesters, the following compounds can be cited, but the present invention is not limited thereby.

(1) Examples of Homopolymers
HP-1: poly(ethylene 2,6-naphthalate) (PEN)
HP-2: poly(ethylene terephthalate) (PET)

| (2) Examples of copolymers | Composition (molar ratio) |
|---|---|
| CP-1: 2,6-NDCA/TPA/EG | (20/80/100) |
| CP-2: 2,6-NDCA/IPA/EG | (80/20/100) |
| CP-3: 2,6-NDCA/TPA/EG | (80/20/100) |
| CP-4: TPA/EG/BPA · 2EO | (100/25/75) |
| CP-5: TPA/EG/CHDM/BPA · 2EO | (100/25/25/50) |
| CP-6: TPA/EG/CHDM | (100/80/20) |
| (3) Examples of polymer blends | Composition (ratio by weight) |
| PB-1: PEN/PET | (20/80) |
| PB-2: PAr/PET | (15/85) |
| PB-3: PAr/PCT/PET | (15/10/75) |
| PB-4: PAr/PC/PET | (10/10/80) |

(NDCA: naphthalenedicarboxylic acid, TPA: terephthalic acid, IPA: isophthalic acid, BPA · 2EO: adduct of bisphenol A with two ethylene oxides, CHDM: cyclohexanedimethanol, EG: ethylene glycol)
(PEN: poly(ethylene naphthalate), PET: poly(ethylene terephthalate), PAr: polyarylate, PCT: poly(cyclohexanedimethanol terephthalate), PC: polycarbonate)

It is desirable for these polymers to have an intrinsic viscosity of 0.4 to 8.0, preferably 0.45 to 0.7, and more preferably 0.5 to 0.7 in dl/g units.

Such polyesters are synthesized by heating the starting dicarboxylic acid diester (usually the dimethyl ester) and diol at atmospheric pressure in the presence of an ester exchange catalyst at 150 to 250° C., reacting them for 0.5 to 5 hours while distilling away the methanol produced as a by-product, and gradually increasing the vacuum from atmospheric pressure to 0.3 Torr at a temperature of 250° C. to 290° C. while stirring so that a polycondensation reaction is effected. The synthesis of polyesters can be carried out by referring to, for example, 'Kobunshi Jikkengaku (Polymer Experiments)' Vol. 5, 'Jushukugo to Jufuka (Polycondensation and Polyaddition)' (Kyouritsu Publishing, 1980), pp.103 to 136, 'Goseikobunshi (Synthetic Polymers) V' (Asakura Shoten, 1971), pp. 187 to 286, Japanese Patent Application Laid-open Nos. 5-163337, 3-179052, 2-3420 and 1-275628, etc. The polyester so polymerized is removed, cooled with water, solidified in the form of strands and then cut into pellets.

The present invention is characterized in that extremely fine particles are uniformly dispersed at a high concentration, and fine particles of 1 nm to 400 nm, preferably 5 nm to 200 nm, and more preferably 10 nm to 100 nm, are added to the polyester at 10 wt % to 60 wt %, preferably 15 wt % to 50 wt %, and more preferably 20 wt % to 45 wt %. When the size is less than 1 nm, it is difficult to disperse the particles and they aggregate; on the other hand when it is more than 400 nm the haze increases, and the transparency is degraded in either case.

With regard to desirable fine particles, inorganic fine particles such as silicon oxide, aluminum oxide, titanium oxide, zirconium oxide, mica, talc, calcium carbonate, barium sulfate, zinc oxide, magnesium oxide, calcium sulfate and kaolin, and organic fine particles such as crosslinked polystyrene can be cited. Silicon oxide, aluminum oxide, titanium oxide, zirconium oxide, mica, talc and calcium carbonate are preferred. The fine particles may be in any shape including amorphous, plate-like, spherical or acicular, and mixtures of more than one type of fine particles may be used.

These fine particles may be added to the monomers that are to be polymerized to give a polyester or may be added to the polyester formed after polymerization, but in the former case the viscosity increases during polymerization so making it difficult to control the polymerization, and therefore the latter case is preferred, wherein the fine particles can easily be dispersed uniformly.

In order to improve the wettability of the fine particles by the polyester it is preferable to modify the surface of the fine particles. With regard to the surface modifying agents, higher fatty acids, metal salts of higher fatty acids, higher fatty acid esters, higher fatty acid amides, and coupling agents such as silicates, titanates and aluminates can be cited.

Prior to the dispersion of the fine particles it is preferable for them to be added to a molten polyester oligomer so as to pre-coat the surface of the fine particles with polyester. The intrinsic viscosity of the oligomer is desirably 0.01 to 0.4, preferably 0.03 to 0.3, and more preferably 0.05 to 0.2 in dl/g units. The ratio (P/O) of fine particles (P) to oligomer (O) is desirably 1 to 100, preferably 3 to 50, and more preferably 5 to 20.

The oligomer and fine particles can be mixed using a Banbury mixer, kneader, roll mill or a single or twin screw extruder. The mixing temperature is 100° C. to 350° C., preferably 120° C. to 300° C., and more preferably 250° C. to 280° C. The mixing time is 1 min. to 200 min., preferably 2 min. to 100 min., and more preferably 3 min. to 30 min.

The mixture is then kneaded with a polyester. The kneading can be carried out using a Banbury mixer, kneader, roll mill or a single or twin screw extruder. The kneading temperature is 200° C. to 350° C., preferably 240° C. to 340° C., and more preferably 260° C. to 330° C. The kneading time is 1 min. to 200 min., preferably 2 min. to 100 min., and more preferably 3 min. to 30 min.

Such a polyester containing fine particles may be formed into a single layer film, but it is preferably used as a co-extruded film. By so doing the difference in modulus of surface elasticity between the two surfaces can be adjusted to be desirably 0.5 GPa to 10 GPa, preferably 0.8 GPa to 7 GPa, and more preferably 1.0 GPa to 5 GPa. If either surface has a high surface hardness, the retaining force of feed rollers decreases so easily causing abrasion due to slip during film formation. Such a co-extruded film may be formed by co-extruding (B/A) a polyester layer (layer B) containing fine particles on one side of a polyester layer (layer A) having a fine particle content less than that of layer B, or further co-extruding (B/A/B') a polyester layer (layer B') having a fine particle content less that that of layer B on the side of layer A opposite to layer B.

The total layer thickness of the polyester film in the present invention is desirably 50 μm to 300 μm, preferably 80 μm to 260 μm, and more preferably 100 μm to 250 μm. The thickness of layers B and B' is 10 μm to 100 μm, preferably 15 μm to 80 μm, and more preferably 20 μm to 50 μm.

The ratio (D/Tb) of the particle size (D) of the fine particles to the thickness (Tb) of layers B and B' is desirably $1\times10^{-5}$ to $1\times10^{-2}$, preferably $1\times10^{-4}$ to $5\times10^{-2}$, and more preferably $1\times10^{-4}$ to $1\times10^{-3}$.

The polyester film of the present invention can be formed as follows.

(1) Drying of Polyester Resin

Polyester pellets are dried at 100° C. to 250° C., and preferably 130° C. to 200° C., for 5 min. to 5 hours, and preferably 10 min. to 1 hour.

(2) Melt Extrusion

Pellets for the layers A, B and B' are placed separately in mono or multi-screw kneader-extruders and melted. In this stage, pellets to which a desired amount of fine particles has been added beforehand may be used, or pellets (masterbatch pellets) to which a high concentration of fine particles has been added may be diluted with pellets containing no fine particles to give the required concentration.

The extrusion temperature is 250° C. to 350° C., preferably 260° C. to 340° C., and the polyester is melted by retaining it for 1 min. to 30 min., and preferably 3 min. to 15 min. Subsequently, the molten polymer is preferably filtered through a filter. With regard to the filter, metal mesh, sintered metal mesh, sintered metal, sand, glass fiber, etc. can be cited. The preferred filter size is 1 μm to 30 μm.

The molten polyester is extruded through a T die. When forming a co-extruded film, the components are extruded using a T die (multi-manifold die, etc.) having the layer structure. The polyester is solidified on a casting drum at 40° C. to 100° C. to give an unstretched film. In this stage it is preferable to employ an electrostatic pinning method, a water film formation method (a fluid such as water is coated on the casting drum so as to increase the contact between the melt and the drum), etc. so increasing the contact with the casting drum since the flatness of the film can be improved. The film is peeled off to give an unstretched sheet.

(3) MD Stretching

The unstretched sheet is then stretched in the machine direction (MD). The preferable stretching ratio is 2.5 times to 4 times, and more preferably 3 times to 4 times. The stretching temperature is desirably 70° C. to 160° C., preferably 80° C. to 150° C., and more preferably 80° C. to 140° C. The stretching speed is desirably 10%/sec. to 300%/sec., preferably 30%/sec. to 250%/sec., and more preferably 50%/sec. to 200%/sec. Such MD stretching can be carried out by feeding the sheet between pairs of rollers having different rotational rates.

(4) TD Stretching

Subsequently, the sheet is stretched in the transverse direction (TD). The stretching ratio is desirably 2.5 times to 5 times, preferably 3 times to 4.5 times, and more preferably 3.3 times to 4.3 times. The stretching temperature is desirably 75° C. to 165° C., preferably 80° C. to 160° C., and more preferably 85° C. to 155° C. The preferred stretching speed is 10%/sec. to 300%/sec., preferably 30%/sec. to 250%/sec., and more preferably 50%/sec, to 200%/sec. Such TD stretching can be carried out by feeding the film, the two edges thereof being clipped, through a tenter so increasing the width.

(5) Thermal Fixation

The fixation temperature is desirably 190 to 275° C., preferably 210 to 270° C., and more preferably 230 to 270° C. The desirable treatment time is 5 to 180 sec., preferably 10 to 120 sec., and more preferably 15 to 60 sec.

It is desirable for the film to be relaxed in the width direction during the thermal fixation by 0 to 10%, preferably 0 to 8%, and more preferably 0 to 6%.

Such thermal fixation and relaxation can be carried out by feeding the film, the both edges thereof being clipped, to a thermal fixation zone so reducing its width.

(6) Wind Up

After the thermal fixation the film is cooled, trimmed and wound up. In this stage it is preferable to carry out a thickening process (knurling) of the support edges. The film width is desirably 0.5 to 10 m, preferably 0.8 to 8 m, and more preferably 1 to 6 m.

The polyester film so prepared is preferably subjected to a surface treatment. The surface treatment includes chemical treatment, mechanical treatment, corona treatment, flame treatment, UV radiation treatment, high frequency treatment, glow discharge treatment, activated plasma treatment, laser treatment, mixed acid treatment, ozone oxidation, etc. Thereamong, the corona treatment, UV radiation treatment, glow discharge treatment and flame treatment are particularly effective. These treatments can be carried out according to the methods described in 'Hatsumei Kyokai Koukai Giho (Technical Disclosures, Kougi No. 94-6023 published by Japan Institute of Invention and Innovation'.

Moreover, at least one primer layer can be provided in order to enhance the adhesion to a layer that is to be applied on the transparent support. With regard to materials for the primer layer, copolymers of vinyl chloride, vinylidene chloride, butadiene, (meth)acrylic (methacrylic or acrylic) acid esters, vinyl ester, etc., water-soluble polymers such as latex and gelatin, etc. can be cited.

(Hard Coat Layer)

The hard coat layer has the function of introducing abrasion resistance to the transparent support. The hard coat film of the present invention comprises a specified hard coat layer on a transparent support.

The hard coat layer contains a crosslinked polymer. The hard coat layer containing a crosslinked polymer can be formed by coating a coating liquid containing a radiation polymerizable polyfunctional compound and polymerization initiator on a transparent support and polymerizing the radiation polymerizable polyfunctional compound. With regard to the functional groups, groups having a polymerizable unsaturated double bond are preferred. With regard to examples of the groups having a polymerizable unsaturated double bond, acrylate, methacrylate and vinyl groups can be cited. In terms of reactivity, acrylate groups are preferably used.

The hard coat layer used in the present invention can also employ a known curable resin; there are thermosetting resins and radiation polymerizable resins, etc., and the radiation polymerizable resins are preferred. With regard to the thermosetting resins, reactive resins that employ a crosslinking reaction of a prepolymer of a melamine resin, urethane resin, epoxy resin, etc. can be cited.

With regard to the radiation, radioactive rays, gamma rays, alpha rays, electron beams, ultraviolet (UV) radiation (including near-ultraviolet radiation, medium-ultraviolet radiation, far-ultraviolet radiation and vacuum ultraviolet radiation), etc. can be cited, and ultraviolet radiation and electron beams are preferred.

The radiation polymerizable polyfunctional compounds are preferably esters of polyhydric alcohols and acrylic acid or methacrylic acid. With regard to examples of the polyhydric alcohols, ethylene glycol, cyclohexane-1,4-diol, pentaerythritol, trimethylolpropane, trimethylolethane, dipentaerythritol, cyclohexane-1,2,4-triol, polyurethanepolyol and polyester polyols are included. Trimethylolpropane, pentaerythritol, dipentaerythritol and polyurethanepolyol are preferred. Combinations of more than one type of radiation polymerizable polyfunctional compound may be used.

With regard to examples of the radiation polymrizable resin, polyfunctional compounds that are polymrizable with radiation and, in particular, UV radiation, such as pentaerythritol tetra(meth)acrylate, dipentaerythritol hexa (meth)acrylate and trimethylolpropane tri(meth)acrylate, can be cited.

The addition of inorganic fine particles to the hard coat layer can improve the percentage shrinkage due to the crosslinking of the layer and can increase the flatness and hardness of the coating. Inorganic fine particles are generally harder than organic materials and do not shrink as a result of irradiation by UV, etc. Therefore, by adding the inorganic fine particles to the hard coat layer the entire layer becomes hard so improving the abrasion resistance and at the same time the shrinkage of the hard coat layer due to the crosslinking reaction can be suppressed so preventing deformation of the hard coat film. However, since the compatibility of the inorganic fine particles with the binder polymer is low, when the inorganic fine particles are added without further treatment the bond between the inorganic fine particles and the binder polymer is easily broken, and it is thus difficult to improve the abrasion resistance and deformation. In order to improve the compatibility of the inorganic fine particles with the binder polymer the inorganic fine particles are subjected to a surface treatment with a coupling agent, an organic compound containing an anionic group, etc. that has high compatibility with the fine particles. It has been confirmed that if the surface treatment agent has a residual group having a carbon-carbon double bond that can be crosslinked with the binder polymer, such as a (meth)acrylate group, the compatibility between the binder polymer and inorganic particles is enhanced and the strength of the hard coat layer is not degraded. If the acrylate compound is one containing a phosphorus atom that has a high compatibility with metals, the above-mentioned effect can be further enhanced.

With regard to the inorganic fine particles, those having high hardness are preferred, and inorganic particles having a hardness of at least 6 on the Mohs scale are more preferred. For example, particles of silicon dioxide, titanium dioxide, zirconium oxide, aluminum oxide, tin oxide, calcium carbonate, barium sulfate, talc, kaolin and calcium sulfate are included. Among the above-mentioned particles, particles of silicon dioxide, titanium dioxide, aluminum oxide and zirconium oxide are particularly preferred.

The average particle size of the inorganic fine particles is desirably 1 to 2000 nm, preferably 2 to 1000 nm, more preferably 5 to 500 nm, particularly preferably 5 to 200 nm, and most preferably 10 to 100 nm. When it is less than 1 nm it is difficult to carry out dispersion and the particles aggregate, when it exceeds 2000 nm the haze increases, and in both cases the transparency is undesirably degraded.

The amount of inorganic fine particles added is desirably 1 to 99 wt % of the total amount of the hard coat layer, preferably 10 to 90 wt %, more preferably 15 to 50 wt %, and most preferably 20 to 45 wt %.

Since the compatibility between the inorganic fine particles and the binder polymer is generally poor, if the two materials are merely mixed, the interface between the two materials is easily broken so causing cracks in the film, and it is thus difficult to improve the abrasion resistance. The compatibility between the inorganic fine particles and the polymer binder can be improved by treating the inorganic fine particles with a surface treatment agent containing an organic segment, and thus the above-mentioned problem can be solved. It is necessary for the surface treatment agent to be able to form a bond to the inorganic particles and also to have high compatibility with the binder polymer. With regard to functional groups that can form a bond to metals, metal alkoxides are preferred, and in practice compounds of silicon, aluminum, titanium, zirconium, etc. can be cited. Alternatively, compounds having an anionic group can desirably be used and a preferred organic compound is selected from the group consisting of a mono-ester of phosphoric acid, a di-ester of phosphoric acid, a compound containing a phosphonic acid group, a mono-ester of sulfuric acid, a compound containing sulfonic acid group, and a compound containing a carbonic acid group. It is desirable for the surface treatment agent to chemically bond to the binder polymer, and those having a polymerizable vinyl group as a terminal group are suitable. For example, when the binder polymer is synthesized from a monomer having an ethylenically unsaturated group as the polymerizable and crosslinkable group, a metal alkoxide compound or an anionic compound having an ethylenically unsaturated group as a terminal group is preferred.

The surface modification of these inorganic fine particles is preferably carried out in solution. That is to say, inorganic fine particles are added to a solution of a surface treatment agent, and the mixture is stirred and dispersed using ultrasound, a stirrer, a homogenizer, a dissolver or a sand grinder.

This surface treatment may be carried out by coating the inorganic fine particles with the surface treatment agent, then adding them to the binder polymer and curing and crosslinking the coated surface treatment agent at the same time as the binder polymer is crosslinked.

Examples of the organometallic compound surface treatment agents a) Silicon-containing Organic Compounds
a-1 $H_2C=CHCOOC_3H_6OSi(OC_4H_9)_3$
a-2 $(H_2C=CHCOOC_3H_6O)_2Si(OC_4H_9)_2$
a-3 $(H_2C=CHCOOC_3H_6O)_3SiOC_4H_9$
a-4 $H_2C=CHCOOC_3H_6OSi(OCH_3)_3$
a-5 $(H_2C=CHCOOC_3H_6O)_2Si(OCH_3)_2$
a-6 $(H_2C=CHCOOC_3H_6O)_3SiOCH_3$ b) Aluminum-containing Organic Compounds
b-1 $H_2C=CHCOOC_4H_8OAl(OC_4H_9)_2$
b-2 $H_2C=CHCOOC_3H_6OAl(OC_3H_7)_2$
b-3 $H_2C=CHCOOC_2H_4OAl(OC_2H_5)_2$
b-4 $H_2C=CHCOOC_2H_4OC_2H_4OAl(OC_2H_4OC_2H_5)_2$
b-5 $H_2C=C(CH_3)COOC_4H_8OAl(OC_4H_9)_2$
b-6 $H_2C=CHCOOC_4H_8OAl(OC_4H_9)OC_4H_8COOCH=CH_2$
b-7 $H_2C=CHCOOC_2H_4OAl\{O(1,4\text{-ph})CH_3\}_2$ c) Zirconium-containing Organic Compounds
c-1 $H_2C=CHCOOC_4H_8OZr(OC_4H_9)_3$
c-2 $H_2C=CHCOOC_3H_6OZr(OC_3H_7)_3$
c-3 $H_2C=CHCOOC_2H_4OZr(OC_2H_5)_3$ c-4 $H_2C=C(CH_3)COOC_4H_8OZr(OC_4H_9)_3$
c-5 $\{CH_2=C(CH_3)COOC_3H_6\}_2Zr(OC_4H_9)_2$
d) Titanium-containing Organic Compounds
d-1 $\{CH_2=C(CH_3)COO\}_3TiOC_3H_6OC_2H_4OCH_3$
d-2 $\{CH_2=C(CH_3)COOC_3H_6\}_2Ti(OCH_3)_2$
d-3 $H_2C=CHCOOC_4H_8OTi(OC_4H_9)_3$
d-4 $H_2C=CHCOOC_3H_6OTi(OC_3H_7)_3$
d-5 $H_2C=CHCOOC_2H_4OTi(OC_2H_5)_3$
d-6 $H_2C=CHCOOC_3H_6Ti(OCH_3)_3$
d-7 $H_2C=C(CH_3)COOC_4H_8OTi(OC_4H_9)_3$ Examples of surface treatment agents containing an anionic functional group:

e) Organic Compounds Such as Monoesters or Diesters of Phosphoric Acid or Organic Compounds Containing a Phosphonic Acid —$PO(OH)_2$ Group
e-1 $H_2C=C(CH_3)COOC_2H_4OPO(OH)_2$
e-2 $H_2C=C(CH_3)COOC_2H_4OCOC_5H_{10}OPO(OH)_2$
e-3 $H_2C=CHCOOC_2H_4OCOC_5H_{10}OPO(OH)_2$
e-4 $H_2C=C(CH_3)COOC_2H_4OCOC_5H_{10}OPO(OH)_2$
e-5 $H_2C=C(CH_3)COOC_2H_4OCOC_5H_{10}OPOCl_2$
e-6 $H_2C=C(CH_3)COOC_2H_4CH\{OPO(OH)_2\}_2$
e-7 $H_2C=C(CH_3)COOC_2H_4OCOC_5H_{10}OPO(ONa)_2$
e-8 $H_2C=CHCOOC_2H_4OCO(1,4\text{-}ph)C_5H_{10}OPO(OH)_2$
e-9 $(H_2C=C(CH_3)COO)_2CHC_2H_4OCOC_5H_{10}OPO(OH)_2$
e-10 $H_2C=CHPO(OH)_2$ f) Organic Compounds Such as Monoesters of Sulfuric Acid or Organic Compounds Containing a Sulfonic Acid —$SO_3H$ Group
f-1 $H_2C=C(CH_3)COOC_2H_4OSO_3H$
f-2 $H_2C=C(CH_3)COOC_3H_6SO_3H$
f-3 $H_2C=C(CH_3)COOC_2H_4OCOC_5H_{10}OSO_3H$
f-4 $H_2C=CHCOOC_2H_4OCOC_5H_{10}OSO_3H$
f-5 $H_2C=CHCOOC_{12}H_{24}(1,4\text{-}ph)SO_3H$
f-6 $H_2C=C(CH_3)COOC_2H_4OCOC_5H_{10}OSO_3Na$ g) Organic Compounds Containing a Carbonic Acid Group
g-1 $H_2C=CHCOOC_5H_{10}COOC_5H_{10}COOH$
g-2 $H_2C=CHCOOC_5H_{10}COOH$
g-3 $H_2C=CHCOOC_2H_4OCO(1,2\text{-}ph)COOH$
g-4 $H_2C=CHCOOC_2H_4COOC_2H_4COOH$
g-5 $H_2C=C(CH)COOC_5H_{10}COOH$
g-6 $H_2C=CHCOOC_2H_4COOH$ Here, ph denotes a phenylene group.

In the case of polymerising by UV radiation, it is preferable to use a photopolymerization initiator in the crosslinking reaction of the binder polymer (polymerization of radiation polymerizable polyfunctional compound). Examples of the photopolymerization initiator include acetophenones, benzophenones, Michler's ketone, Michler's benzoylbenzoate, benzoylbenzoate, benzoins, α-amyloxime esters, tetramethyl thiuram monosulfide and thioxanthones. In addition to the photopolymerization initiator, a photosensitizer may be used. Examples of the photosensitizer include n-butylamine, triethylamine, tri-n-butylphosphine, Michler's ketone and thioxanthones.

The amount of photopolymerization initiator used is preferably in the range from 0.1 to 15 parts by weight relative to 100 parts by weight of the radiation polymerizable polyfunctional compound, and more preferably in the range from 1 to 10 parts by weight.

The photopolymerization reaction is preferably carried out by irradiating the coated and dried hard coat layer with radiation, and more preferably with UV radiation.

The hard coat layer or coating liquid therefor may further contain colorants (pigments, dyes), antifoaming agents, viscosity improvers, leveling agents, fire retardants, UV radiation absorbers, antioxidants and modifier resins.

The coating liquid for the hard coat layer is preferably prepared using an organic solvent as a medium, and more preferably using an organic solvent having a high polarity. Examples of the organic solvent include alcohols (e.g., methanol, ethanol, isopropanol, butanol and benzyl alcohol), ketones (e.g., acetone, methyl ethyl ketone, methyl isobutyl ketone and cyclohexanone), esters (e.g., methyl acetate, ethyl acetate, propyl acetate, butyl acetate, methyl formate, ethyl formate, propyl formate and butyl formate), aliphatic hydrocarbons (e.g., hexane and cyclohexane), halogenated hydrocarbons (e.g., methylene chloride, chloroform and carbon tetrachloride), aromatic hydrocarbons (e.g., benzene, toluene and xylene), amides (e.g., dimethylformamide, dimethylacetamide and N-methylpyrrolidone), ethers (e.g., diethyl ether, dioxane and tetrahydrofuran) and ether alcohols (e.g., 1-methoxy-2-propanol). Combinations of more than one type of organic solvent may be used.

The above-mentioned radiation polymerizable polyfunctional compound and polymerization initiator are added to a solution of surface-treated inorganic fine particles to give a coating liquid for the hard coat layer.

The thickness of the hard coat layer is desirably 2 μm to 30 μm, preferably 3 μm to 20 μm, and more preferably 5 μm to 15 μm.

The hydrophilic properties and adhesion properties of the surface can be further improved by adding anionic and cationic surfactants or by carrying out a surface treatment such as a corona or glow discharge treatment as necessary.

It is also preferable to apply an antistatic layer to the hard coat film. With regard to the antistatic agents, metal oxides, electrically conductive metals, carbon fibers, π-conjugated type polymers (polyallylenevinylene, etc.), ionic compounds, etc. can be cited, and those having a volume resistivity of $10^7$ Ωcm or below, preferably $10^6$ Ωcm or below, and more preferably $10^5$ Ωcm or below, are used. Electrically conductive metal oxides, derivatives thereof, etc. can be used, and among these crystalline metal oxide particles are particularly preferably used as the electrically conductive material. ZnO, $TiO_2$, $SnO_2$, $Al_2O_3$, $In_2O_3$, $SiO_2$, MgO, BaO, $MoO_3$ and $V_2O_5$ can be cited, and particularly preferred substances are those containing $SnO_2$ as the main component, and about 5 to 20% of antimony oxide and/or another component (e.g., silicon oxide, boron, phosphorus, etc.). Details of these electrically conductive materials and the coating method are described in 'Hatsumei Kyokai Koukai Giho (Technical Disclosures, Kougi No. 94-6023 published by Japan Institute of Invention and Innovation', and they can be carried out according to the description therein.

(High Refractive Index Layer and Medium Refractive Index Layer)

As shown in FIG. 1(c), a high refractive index layer may be provided between the hard coat layer and a low refractive index layer. Furthermore, a medium refractive index layer may be provided between the hard coat layer and the high refractive index layer as shown in FIG. 1(d).

The refractive index of the high refractive index layer is preferably 1.65 to 2.40, and more preferably 1.70 to 2.20. The refractive index of the medium refractive index layer is adjusted so that its value lies between the refractive index of the transparent support and that of the high refractive index layer. The refractive index of the medium refractive index layer is preferably 1.55 to 1.80. The refractive Index difference of the high and medium reflective Index layers Is preferably 0.1 or above.

The thickness of the high and medium refractive index layers is preferably 5 nm to 100 μm, more preferably 10 nm to 10 μm, and most preferably 30 nm to 1 μm.

The haze of the high and medium refractive index layers is preferably 5% or below, more preferably 3% or below, and most preferably 1% or below.

The hardness of the high and medium refractive index layers is preferably H or above when measured in a pencil hardness test with a load of 1 kg weight (9.8 N), more preferably 2H or above, and most preferably 3H or above.

The high and medium refractive index layers preferably contain inorganic fine particles and a polymer.

The refractive index of the inorganic fine particles used in the high and medium refractive index layers (hereinafter, termed high refractive index inorganic fine particles) is preferably 1.80 to 2.80, and more preferably 1.90 to 2.80.

The mass-averaged mean diameter of the primary particles of the high refractive index inorganic fine particles is preferably 1 to 150 nm, more preferably 1 to 100 nm, and most preferably 1 to 80 nm.

The mass-averaged mean diameter of the high refractive index inorganic fine particles in the coated layer is desirably 1 to 200 nm, preferably 5 to 150 nm, more preferably 10 to 100 nm, and most preferably 10 to 80 nm.

The specific surface area of the high refractive index inorganic fine particles is preferably 10 to 400 $m^2/g$, more preferably 20 to 200 $m^2/g$, and most preferably 30 to 150 $m^2/g$.

The high refractive index inorganic fine particles are desirably formed from a metal oxide or sulfide. Examples of the meal oxide and sulfide include titanium oxide (e.g., rutile, mixed crystals of rutile/anatase, anatase, and amorphous), tin oxide, indium oxide, zinc oxide, zirconium oxide and zinc sulfide. Titanium oxide, tin oxide and indium oxide are particularly preferred. The high refractive index inorganic fine particles contain the oxide or sulfide of such a metal as the main component and can further contain another element. The term 'main component' means a component which is present in the particles in the largest amount (wt %) among the components forming the particle. Example of the other elements include Ti, Zr, Sn, Sb, Cu, Fe, Mn, Pb, Cd, As, Cr, Hg, Zn, Al, Mg, Si, P and S.

The high refractive index inorganic fine particles may be subjected to a surface treatment. The surface treatment is carried out using an inorganic or an organic compound. Examples of the inorganic compound used for the surface treatment include aluminum oxide, silicon oxide, zirconium oxide and iron oxide. Aluminum oxide and silicon oxide are preferred. Examples of the organic compound used for the surface treatment include polyols, alkanolamines, stearic acid, silane coupling agents and titanate coupling agents. The silane coupling agents are most preferred. The surface treatment may be carried out using combinations of more than one type of compound.

The shape of the high refractive index inorganic fine particles is preferably granular, spherical, cubic, spindle-shaped or amorphous.

Combinations of more than one type of high refractive index inorganic fine particles may be used for the high and medium refractive index layers.

The proportion of high refractive index inorganic fine particles in the high and medium refractive index layers is 5 to 65 vol %, preferably 10 to 60 vol %, and more preferably 20 to 55 vol %.

The high refractive index inorganic fine particles are used as a dispersion when forming the high and medium refractive index layers. The dispersing medium for the high refractive inorganic fine particles in the high and medium refractive index layers is preferably a liquid having a boiling point from 60 to 170° C. Examples of the dispersing medium include water, alcohols (e.g., methanol, ethanol, isopropanol, butanol and benzyl alcohol), ketones (e.g., acetone, methyl ethyl ketone, methyl isobutyl ketone and cyclohexanone), esters (e.g., methyl acetate, ethyl acetate, propyl acetate, butyl acetate, methyl formate, ethyl formate, propyl formate and butyl formate), aliphatic hydrocarbons (e.g., hexane and cyclohexane), halogenated hydrocarbons (e.g., methylene chloride, chloroform and carbon tetrachloride), aromatic hydrocarbons (e.g., benzene, toluene and xylene), amides (e.g., dimethylformamide, dimethylacetamide, N-methylpyrrolidone), ethers (e.g., diethyl ether, dioxane and tetrahydrofuran) and ether alcohols (e.g., 1-methoxy-2-propanol). Toluene, xylene, methyl ethyl ketone, methyl isobutyl ketone, cyclohexanone and butanol are particularly preferred.

The high refractive index inorganic fine particles can be dispersed in the medium using a disperser. Examples of the disperser include sand grinder mills (e.g., pin bead mills), high speed impeller mills, pebble mills, roller mills, attritors and colloid mills. The sand grinder mills and high speed impeller mills are particularly preferred. A preliminary dispersion treatment may be carried out. Examples of the disperser used for the preliminary dispersion treatment include ball mills, three roll mills, kneaders and extruders.

It is desirable to use a polymer having a comparatively high refractive index in the high and medium refractive index layers. Examples of the polymer having a high refractive index include polystyrene, styrene copolymers, polycarbonates, melamine resins, phenol resins, epoxy resins and polyurethanes obtained by the reaction between a cyclic (alicyclic or aromatic) isocyanate and a polyol. In addition, polymers having another cyclic (aromatic, heterocyclic, alicyclic) group and polymers having a halogen atom other than fluorine as a substituent have a high refractive index. The polymer may be formed from a monomer which has been made radically polymerizable by the introduction of a double bond.

(Low Refractive Index Layer)

The refractive index of the low refractive index layer is preferably 1.20 to 1.55, and more preferably 1.30 to 1.55.

The thickness of the low refractive index layer is preferably 50 nm to 400 μm, and more preferably 50 nm to 200 μm.

The low refractive index layer preferably has a porosity of 3 to 50 vol %, and more preferably 5 to 35 vol %. The voids in the low refractive index layer can be formed using fine particles as microvoids between the fine particles, or inside the fine particles.

The average particle size of the fine particles is desirably 0.5 to 200 nm, preferably 1 to 100 nm, more preferably 3 to 70 nm, and most preferably 5 to 40 nm. The particle size of the fine particles is desirably as uniform as possible (monodisperse).

Either inorganic or organic fine particles can be used in the low refractive index layer.

The inorganic fine particles are desirably noncrystalline.

The inorganic fine particles preferably comprise an oxide, nitride, sulfide or halide of a metal, more preferably a metal oxide or metal halide, and most preferably a metal oxide or metal fluoride. With regard to the metal atoms, Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, Pb and Ni are preferred, and Mg, Ca, B and Si are more preferred. An inorganic compound containing two types of metal may be used.

The particularly preferred compound is silicon dioxide.

The microvoids inside the inorganic fine particles can be formed, for example, by crosslinking molecules of the silicon oxide forming the particles. When molecules of silicon oxide are crosslinked, the volume decreases and the particles become porous.

(Porous) inorganic fine particles having microvoids can be directly synthesized as a dispersion by sol-gel methods (Japanese Patent Application Laid-open No. 53-112732 and Japanese Patent Publication No. 57-9051) or a deposition method (Applied Optics, 27, p. 3356 (1988)). They can also be obtained as a dispersion by mechanically grinding a powder obtained by a dehydration-precipitation method. Commercially available porous inorganic fine particles (e.g. silicon dioxide sols) may also be employed.

The inorganic fine particles having microvoids are preferably used as a dispersion in an appropriate medium when forming the low refractive index layer. With regard to the dispersing medium, water, alcohols (e.g., methanol, ethanol, and isopropanol) and ketones (e.g., methyl ethyl ketone and methyl isobutyl ketone) are preferred.

The organic fine particles are also preferably noncrystalline.

The organic fine particles are preferably polymer fine particles synthesized by the polymerization (e.g., emulsion polymerization) of a monomer. It is desirable for the organic fine particles to be a polymer containing fluorine. The proportion of fluorine in the polymer is preferably 35 to 80 wt %, and more preferably 45 to 75 wt %.

Examples of monomers containing a fluorine atom which can be used for the synthesis of the fluorine-containing polymer include fluoro-olefins (e.g., fluoroethylene, vinylidene fluoride, tetrafluoroethylene, hexafluoropropylene, perfluoro-2,2-dimethyl-1,3-dioxole), fluorinated alkyl esters of acrylic acid and methacrylic acid and fluorinated vinyl ethers. Copolymers of a monomer containing fluorine and a monomer containing no fluorine may be used. Examples of the monomer containing no fluorine include olefins (e.g., ethylene, propylene, isoprene, vinyl chloride and vinylidene chloride), acrylic acid esters (e.g., methyl acrylate, ethyl acrylate and 2-ethylhexyl acrylate), methacrylic acid esters (e.g., methyl methacrylate, ethyl methacrylate and butyl methacrylate), styrenes (e.g., styrene, vinyltoluene and α-methylstyrene), vinyl ethers (e.g., methyl vinyl ether), vinylesters (e.g., vinyl acetate and vinyl propionate), acrylamides (e.g., N-tert-butylacrylamide and N-cyclohexylacrylamide), methacrylamides and acrylonitriles.

The microvoids inside the organic fine particles can be formed, for example, by crosslinking the polymer forming the particles. When the polymer is crosslinked, the volume decreases and the particles become porous. In order to crosslink the polymer forming the particles it is preferable that the monomer used for synthesizing the polymer comprises at least 20 mol % polyfunctional monomer. The proportion of polyfunctional monomer is more preferably 30 to 80 mol %, and most preferably 35 to 50 mol %.

Examples of the polyfunctional monomer include dienes (e.g., butadiene and pentadiene), esters of a polyhydric alcohol and acrylic acid (e.g., ethylene glycol diacrylate, cyclohexane-1,4-diol diacrylate and dipentaerythritol hexacrylate), esters of a polyhydric alcohol and methacrylic acid (e.g., ethylene glycol dimethacrylate, cyclohexane-1,2, 4-triol trimethacrylate and pentaerythritol tetramethacrylate), divinyl compounds (e.g., divinylcyclohexane and 1,4-divinylbenzene), divinylsulfone, bisacrylamides (e.g., methylene bisacrylamide) and bismethacrylamides.

The microvoids between the particles can be formed by stacking at least two fine particles. When spherical fine particles having an identical particle size (completely monodisperse) are most closely packed, the microvoids between the particles results in a porosity of 26 vol %. When spherical fine particles having an identical particle size are simply cubically packed, the microvoids between the particles results in a porosity of 48 vol %. The low refractive index layer in practice has a porosity which varies considerably from the above-mentioned theoretical values since the particle sizes of the fine particles form a distribution and there are microvoids inside the particles.

When the porosity increases, the refractive index of the low refractive index layer decreases. The size of the microvoids between the particles can easily be controlled to an appropriate value (no light scattering and no problems caused in the strength of the low refractive index layer) by controlling the formation of the microvoids by stacking fine particles and adjusting the particle size of the fine particles. Furthermore, an optically uniform low refractive index layer having uniformly-sized microvoids between the particles can be obtained by making the particle size of the fine particles uniform. It is thus possible to form a low refractive index layer as an optically and macroscopically uniform film although it is microscopically a microvoid-containing porous film.

The macroscopic refractive index of the low refractive index layer is lower than the sum of the refractive indexes of the components forming the low refractive index layer due to the presence of microvoids. The refractive index of a layer is the sum of the refractive indexes per unit volume of the components forming the layer. The refractive indexes of the components forming the low refractive index layer such as fine particles and polymer are greater than 1, and the refractive index of air is 1.00. Therefore, the formation of microvoids can give a low refractive index layer having an extremely low refractive index.

The microvoids between particles are desirably enclosed inside the low refractive index layer by fine particles or polymer. The enclosed microvoids have the advantage that light scattering on the surface of the low refractive index layer can be suppressed in comparison with the surface of a low refractive index layer that has openings.

The low refractive index layer desirably contains 5 to 50 wt % of polymer. The polymer has the function of bonding the fine particles together and maintaining the structure of the low refractive index layer containing voids. The amount of polymer used is adjusted so that the strength of the low refractive index layer can be maintained without filling the voids. The amount of polymer is preferably 10 to 30 wt % of the total amount of the low refractive index layer.

In order to bond the fine particles by means of a polymer it is desirable (1) to bond the polymer to the surface treatment agent used for the fine particles, (2) to form a polymer shell around the fine particles which act as a core, or (3) to use the polymer as a binder between the fine particles.

The polymer that is bonded to the surface treatment agent in (1) is desirably the shell polymer in (2) or the binder polymer in (3). The polymer in (2) is preferably formed around the fine particles by a polymerization reaction prior to the preparation of the coating liquid for the low refractive index layer. The polymer in (3) is preferably formed at the same time as or after the coating of the low refractive index layer by a polymerization reaction in which a monomer is added to the coating liquid for the low refractive index layer. It is preferable to combine two or three from the methods (1) to (3), and it is particularly preferable to combine methods (1) and (3) or the three methods (1) to (3).

The above-mentioned surface treatment in (1), shell polymer in (2) and binder polymer in (3) are explained in turn.

(1) Surface Treatment

It is preferable to subject the fine particles (in particular, inorganic fine particles) used for the low refractive index layer to a surface treatment so as to improve the compatibility with the polymer. The surface treatments can be classified into physical surface treatments such as plasma discharge treatment and corona discharge treatment, and chemical treatments using a coupling agent. It is preferable to carry out a chemical surface treatment alone or a physical surface treatment and chemical surface treatment in combination. With regard to the coupling agents, alkoxymetal compounds (e.g., titanium coupling agents and silane coupling agents) are preferably used. In the case where the fine particles are made of silicon dioxide, a surface treatment using a silane coupling agent can be carried out particularly effectively.

Examples of the silane coupling agents include alkyl esters of orthosilicic acid (e.g., methyl orthosilicate, ethyl orthosilicate, n-propyl orthosilicate, i-propyl orthosilicate, n-butyl orthosilicate, sec-butyl orthosilicate and t-butyl orthosilicate) and hydrolysates thereof.

The surface treatment using a coupling agent can be carried out by adding the coupling agent to a dispersion of fine particles and allowing the dispersion to stand at a temperature of room temperature to 60° C. for a few hours to 10 days. In order to promote the surface treatment reaction, inorganic acids (e.g., sulfuric acid, hydrochloric acid, nitric acid, chromic acid, hypochlorous acid, boric acid, orthosilicic acid, phosphoric acid and carbonic acid), organic acids (e.g., acetic acid, polyacrylic acid, benzenesulfonic acid, phenol and polyglutamic acid), or salts thereof (e.g., metal salts and ammonium salts) may be added to the dispersion.

(2) Shell Polymer

The shell-forming polymer is preferably a polymer having a saturated hydrocarbon as a main chain. A polymer having fluorine atoms in its main chain or side chain is preferred, and a polymer having fluorine atoms in its side chain is more preferred. Poly(acrylic acid esters) and poly(methacrylic acid esters) are preferred, and esters of fluorine-substituted alcohols and polyacrylic acid or polymethacrylic acid are most preferred.

The refractive index of the shell polymer decreases as the amount of fluorine atoms present in the polymer increases. In order to decrease the refractive index of the low refractive index layer it is preferable for the shell polymer to contain 35 to 80 wt % of fluorine atoms, and it is more preferable for it to contain 45 to 75 wt % of fluorine atoms.

The fluorine-containing polymer is preferably synthesized by polymerization of a fluorine-containing ethylenically unsaturated monomer. Examples of the fluorine-containing ethylenically unsaturated monomer include fluoro-olefins (e.g., fluoroethylene, vinylidene fluoride, tetrafluoroethylene, hexafluoropropylene and perfluoro-2,2-dimethyl-1,3-dioxole), fluorovinyl ethers and esters of fluorine-substituted alcohols and acrylic acid or methacrylic acid.

The shell-forming polymer may be a copolymer comprising a repeating unit containing a fluorine atom and a repeating unit containing no fluorine atom.

Such a copolymer may preferably be obtained by copolymerizing, as the repeating unit containing no fluorine atom, an ethylenically unsaturated monomer containing no fluorine atom. Examples of the ethylenically unsaturated monomer containing no fluorine atom include olefins (e.g., ethylene, propylene, isoprene, vinyl chloride and vinylidene chloride), acrylic acid esters (e.g., methyl acrylate, ethyl acrylate and 2-ethylhexyl acrylate), methacrylic acid esters (e.g., methyl methacrylate, ethyl methacrylate, butyl methacrylate and ethylene glycol dimethacrylate), styrene and derivatives thereof (e.g., styrene, divinylbenzene, vinyltoluene and α-methylstyrene), vinyl ethers (e.g., methyl vinyl ether), vinyl esters (e.g., vinyl acetate, vinyl propionate and vinyl cinnamate), acrylamides (e.g., N-tert-butylacrylamide and N-cyclohexylacrylamide), methacrylamides and acrylonitrile.

In the case where the binder polymer in (3) which is described below is used together with a shell polymer, they may be chemically bonded together by introducing a crosslinkable functional group into the shell polymer.

The shell polymer may be crystalline. When the glass transition temperature (Tg) of the shell polymer is higher than the temperature at which the low refractive index layer is formed, it is easy to maintain the microvoids inside the low refractive index layer. However, when the Tg is higher than the temperature at which the low refractive index layer is formed, the fine particles are not melt-bonded in some cases and the low refractive index layer cannot be formed as a continuous layer (and as a result, the strength degrades). In such cases, the binder polymer in (3) which is described below is desirably used together with the shell polymer so that the binder polymer forms the low refractive index layer into a continuous layer.

The polymer shell is formed around the fine particles to give core-shell fine particles. It is preferable for the core-shell fine particles to comprise 5 to 90 vol % of inorganic fine particle core, and more preferably 15 to 80 vol %.

The polymer shell is preferably formed by a radical polymerization method. Radical polymerization methods are described in T. Ootsu and M. Kinoshita, 'Kobunshi Gosei no Jikken-ho (Experimental Methods for the Synthesis of Polymers)', Kagaku Dojin (1972) and T. Ootsu, 'Kouza Jugo Hannou-ron 1, Radical Jugo (I) (Lecture, Polymerization Reactions 1, Radical Polymerization (I)', Kagaku Dojin (1971). More particularly, the radical polymerization is preferably carried out by an emulsion polymerization or a dispersion polymerization. Emulsion polymerization is described in Soichi Muroi, "Kobunshi Latex no Kagaku (Chemistry of Polymer Latexes)", issued by Kobunshi Kanko Kai (1970). Dispersion polymerization is described in Barrett, Keith E. J., Dispersion Polymerization in Organic Media, JOHN WILEY & SONS (1975).

A thermal polymerization initiator may be used in the emulsion polymerization and dispersion polymerization methods.

Examples of the thermal polymerization initiators used in the emulsion polymerization method include inorganic peroxides (e.g., potassium persulfate and ammonium persulfate), azonitrile compounds (e.g., sodium azobiscyanovalerate), azoamidine compounds (e.g., 2,2'-azobis(2-methylpropionamide)hydrochloride), cyclic azoamidine compounds (e.g., 2,2'-azobis[2-(5-methyl-2-imidazolin-2-yl)propane]hydrochloride) and azoamide compounds (e.g., 2,2'-azobis{2-methyl-N-[1,1'-bis(hydroxymethyl)-2-hydroxyethyl]propionamide}). The inorganic peroxides are preferred, and potassium persulfate and ammonium persulfate are particularly preferred.

Examples of the thermal polymerization initiators used in the dispersion polymerization method include azo compounds (e.g., 2,2'-azobisisobutyronitrile, 2,2'-azobis(2,4-dimethylvaleronitrile), dimethyl-2,2'-azobis(2-methylpropionate) and dimethyl-2,2'-azobisisobutyrate) and organic peroxides (e.g., lauryl peroxide, benzoyl peroxide and tert-butyl peroctoate).

The dispersion polymerization method is preferably carried out by adding a polymer dispersant to the surface-treated fine particles and dissolving the monomer and polymerization initiator using a polymerization medium in which the polymer so formed is insoluble.

Examples of the polymerization medium include water, alcohols (e.g., methanol, ethanol, propanol, isopropanol, 2-methoxy-1-propanol, butanol, t-butanol, pentanol, neopentanol, cyclohexanol and 1-methoxy-2-propanol), methyl ethyl ketone, acetonitrile, tetrahydrofuran and ethyl acetate. Water, methanol, ethanol and isopropanol are preferred. Combinations of more than one type of polymerization medium may be used.

In the emulsion polymerization and dispersion polymerization methods, a chain transfer agent may be used. Examples of the chain transfer agent include halogenated hydrocarbons (e.g., carbon tetrachloride, carbon tetrabromide, ethyl dibromoacetate, ethyl tribromoacetate, dibromoethylbenzene, dibromoethane and dichloroethane), hydrocarbons (e.g., benzene, ethylbenzene and isopropylbenzene), thioethers (e.g., diazothioether), mercaptans (e.g., t-dodecylmercaptan, n-dodecylmercaptan, hexadecylmercaptan, n-octadecylmercaptan and thioglycerol), disulfides (e.g., diisopropyl xanthogen disulfide), thioglycolic acid and derivatives thereof (e.g., thioglycolic acid, 2-ethylhexyl thioglycolate, butyl thioglycolate, methoxybutyl thioglycolate and trimethylolpropane tris(thioglycolate)).

Combinations of more than one type of core-shell fine particles may be used. It is also possible to use combinations of inorganic fine particles having no shell and core-shell particles.

(3) Binder Polymer

The binder polymer for use In the low reflective Index layer is preferably a polymer having a saturated hydrocarbon or polyether as a main chain and more preferably a polymer having a saturated hydrocarbon as a main chain. The binder polymer is preferably crosslinked. The polymer having a saturated hydrocarbon as a main chain is preferably obtained by the polymerization of an ethylenically unsaturated monomer. In order to obtain a crosslinked binder polymer, it is preferable to use a monomer having at least two ethylenically unsaturated groups.

Examples of the monomers having at least two ethylenically unsaturated groups include esters of polyhydric alcohols and (meth)acrylic acid (e.g., ethylene glycol di(meth)acrylate, cyclohexane-1,4-diol diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, pentaerythritol hexa(meth)acrylate, cyclohexane-1,2,3-triol trimethracrylate, polyurethane polyacrylate and polyester polyacrylate), vinylbenzene and derivatives thereof (e.g., 1,4-divinylbenzene, 2-acryloylethyl-4-vinylbenzoate and 1,4-divinylcyclohexanone), vinylsulfones (e.g., divinyl sulfone), acrylamides (e.g., methylene bisacrylamide) and methacrylamides.

The polymers having a polyether as a main chain are preferably synthesized by a ring-opening polymerization reaction of a polyfunctional epoxy compound.

Instead of or in addition to the monomer having at least two ethylenically unsaturated groups, a crosslinked structure may be introduced into a binder polymer by reaction of a crosslinkable group. Examples of the crosslinkable group include isocyanate, epoxy, aziridine, oxazoline, aldehyde, carbonyl, hydrazine, carboxyl, methylol and activated methylene groups. Vinylsulfonic acid, acid anhydrides, cyanoacrylate derivatives, melamines, etherified methylols, esters and urethanes can also be used as monomers used for introducing a crosslinked structure. A functional group such as a blocked isocyanate group that shows crosslinking properties after deblocking may also be used.

The crosslinkable group referred to in the present invention is not limited to the above-mentioned compounds and may be one which shows its reactivity as a result of the above-mentioned functional group being decomposed.

With regard to the polymerization initiator used in the polymerization and crosslinking reactions of the binder polymer, a photopolymerization initiator is preferred over the thermal polymerization initiators which are used for the synthesis of the shell polymer in (2). Examples of the photopolymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds and aromatic sulfonium compounds. Examples of the acetophenones include 2,2-diethoxyacetophenone, p-dimethylacetophenone, 1-hydroxydimethyl phenyl ketone, 1-hydroxycyclohexyl phenyl ketone, 2-methyl-4-methylthio-2-morpholinopropiophenone and 2-benzyl-2-dimethylamino-1-(4-morpholinophenyl)butanone. Examples of the benzoins include benzoin isopropyl ether. Examples of the benzophenones include benzophenone, 2,4-dichlorobenzophenone, 4,4-dichlorobenzophenone and p-chlorobenzophenone. Examples of the phosphine oxides include 2,4,6-trimethylbenzoyldiphenylphosphine oxide.

In the case where the binder polymer is used together with the shell polymer in (2), the glass transition temperature (Tg) of the binder polymer is preferably lower than the Tg of the shell polymer. The difference in Tg between the binder polymer and the shell polymer is preferably at least 5° C., and more preferably 20° C. or more.

The binder polymer is desirably formed by adding a monomer to the coating liquid for the low refractive index layer and carrying out a polymerization reaction (followed by a crosslinking reaction, if necessary) at the same time as or after the coating of the low refractive index layer.

A small amount of a polymer (e.g., poly(vinyl alcohol), polyoxyethylene, poly(methyl methacrylate), poly(methyl acrylate), diacetyl cellulose, triacetyl cellulose, nitrocellulose, a polyester or an alkyd resin) may be added to the coating liquid for the low refractive index layer.

(Hard Coat Film Having Antireflection Properties)

The hard coat film having antireflection properties may comprise a layer other than the above-mentioned layers. For example, an adhesive layer, a shield layer, a lubricating layer or an antistatic layer may be provided on the transparent support in addition to the hard coat layer. The shield layer is provided in order to block electromagnetic radiation and infrared radiation.

The hard coat film having antireflection properties may have an antiglare function in order to scatter external light. The antiglare function can be introduced by making the surface of the hard coat film rough.

An overcoat layer may be provided on the low refractive index layer. The overcoat layer preferably contains a fluorine-containing compound.

The haze of the hard coat film having an antiglare function and antireflection properties is preferably 3 to 30%, more preferably 5 to 20%, and most preferably 7 to 20%.

The hard coat film having antireflection properties can be applied to a display device such as a liquid crystal display (LCD), a plasma display panel (PDP), an electroluminescent display (ELD) or a cathode ray tube display (CRT). The transparent support side of the hard coat film having antireflection properties is bonded to the display surface of the display device.

(Transparent Electrically Conductive Layer)

The transparent electrically conductive layer in the present invention basically comprises a layer containing particles made of at least one type of metal. With regard to the metal, metals such as gold, silver, copper, aluminum, iron, nickel, palladium and platinum and alloys thereof can be cited. Silver is particularly preferred, and an alloy of palladium and silver is more preferred in terms of weatherability. The palladium content is preferably 5 to 30 wt %; when the amount of palladium is small the weatherability is degraded, and when it is large the conductivity is degraded. With regard to the method of forming the metal particles, a method of preparing fine particles by low vacuum evaporation and a method of preparing a metal colloid in which an aqueous solution of a metal salt is reduced with a reducing agent such as iron (II), hydrazine, boron hydride or an amine including hydroxyethylamine can be cited.

The average particle size of the metal particles is preferably 1 to 100 nm; when it exceeds 100 nm the level of light absorption by the metal particles increases and, therefore, the light transmittance of the particle layer decreases and at the same time the haze increases. When the average particle size of the metal particles is less than 1 nm, it becomes difficult to disperse the particles, and since the surface resistance of the particle layer sharply increases it becomes impossible to obtain a coating having a low resistance so as to achieve the object of the present invention. It is preferable for the transparent electrically conductive layer to substantially consist of metal particles alone and for it not to contain non-conductive materials such as a binder in terms of the conductivity.

A radiation polymerizable compound is used for forming the transparent electrically conductive layer in the present invention. Although it is preferable for the transparent electrically conductive layer to substantially consist of metal particles alone and for it not to contain any non-conductive additive in terms of the conductivity, it has been found by the present inventors that both strength and conductivity can be obtained at the same time if the amount of additive is in the range from 2 to 70 vol % of the metal particles. The amount of radiation polymerizable compound is preferably 5 to 60 vol %, and more preferably 7 to 50 vol % when taking the strength into consideration.

The radiation polymerizable compound added to the transparent layer can be of the same type as that added to the hard coat layer and, for example, pentaerythritol tetra(meth)acrylate, dipentaerythritol hexa(meth)acrylate, etc. can be cited. It is preferable to use the same type as that used for the hard coat layer in terms of improving the adhesion.

The metal particle layer is formed by coating, on the hard coat layer, a coating liquid in which the metal particles have been dispersed in a solvent comprising mainly water, an organic solvent, etc. In order to stabilize the dispersion of metal particles it is preferable to use a solvent comprising mainly water and, with regard to solvents which can be mixed with water in the aqueous solvent, alcohols such as ethyl alcohol, n-propyl alcohol, i-propyl alcohol, butyl alcohol, methyl Cellosolve and butyl Cellosolve are preferred. The amount of metal coated is preferably 50 to 150 mg/m$^2$; when the amount coated is small conductivity cannot be obtained, and when it is large the transparency is degraded.

The surface resistivity of the transparent electrically conductive layer is required to be 1000Ω/ or below in order to meet the TCO guidelines legislated by the Swedish Confederation of Professional Employees, and the transparency is preferably 50% or above.

The surface resistivity is the value for the resistance obtained by placing electrodes on two parallel sides of a square, and its units are Ω, but it is expressed using Ω/☐ for convenience. In the present invention the surface resistivity is expressed using Ω/☐.

In order to improve the conductivity and transparency of the transparent electrically conductivity layer, it may be subjected to a heat treatment or an aqueous treatment. The heat treatment is carried out at 150° C. or below although it depends on the thermal resistance of the plastic film, and preferably 100° C. to 150° C. When it exceeds 150° C., the plastic film is easily deformed due to the heat, and when it is lower than 100° C. the effect of the heat treatment is difficult to obtain and it becomes necessary to carry out the heat treatment for a long time.

With regard to methods used for the heat treatment, it is preferable to feed the film as a web through a heating zone since a uniform treatment can be achieved in this way. The residence time can be controlled by the length of the heating zone and the line speed. It is also possible to heat the film in a wound state in an oven at a high temperature, but this requires setting the time by taking variations in thermal conductivity into consideration.

The heat treatment can be carried out more efficiently by subjecting the transparent electrically conductive layer to an aqueous treatment such as washing with water prior to the heat treatment. The aqueous treatment such as washing with water is carried out by a standard coating method using water alone; in detail, there are dip coating, wire bar coating, etc. and, in addition, a method in which water is applied to the transparent electrically conductive layer using a spray or shower. After applying water to the transparent electrically conductive layer, the excess water can be scraped off by means of a wire bar, rod bar or air knife as necessary.

The surface resistivity of the transparent electrically conductive layer after the heat treatment can be further reduced by such an aqueous treatment, and effects such as an increase in transmittance, leveling of the transmittance spectrum and a decrease in reflection after the antireflection layer is applied become more prominent.

(Antireflection Layer)

The antireflection layer in the present invention has a refractive index different from that of the transparent electrically conductive layer and it is preferable for the refractive index of the antireflection layer to be less than 2. The term 'different refractive index' means that the difference in refractive index is at least 0.1, and when the refractive index becomes a complex number because of absorption by the transparent electrically conductive layer or antireflection layer, layers with a difference in the complex part of more than 0.01 can also be considered to have different refractive indexes. It is preferable that the product of the refractive index and the thickness (nm) of the antireflection layer is in the range from 100 to 200. With regard to such materials that can satisfy the above-mentioned requirements, for example, organic synthetic resins such as polyester resins, acrylic resins, epoxy resins, melamine resins, polyurethane resins, poly(vinyl butyral) resins and UV polymrizable resins, hydrolysates of metal alkoxides such as silicon, organic-inorganic compounds such as silicone monomers and silicone oligomers, and transparent oxide coatings formed by a sol-gel reaction of silicon oxide, aluminum oxide, titanium oxide, zirconium oxide, mixtures thereof, etc. can be cited.

It is particularly preferable to use a radiation polymrizable resin such as pentaerythritol tetra(meth)acrylate or dipentaerythritol hexa(meth)acrylate or one obtained by adding fine particles of silicon oxide, aluminum oxide, etc. to the above-mentioned resins since the surface hardness can also be enhanced. Moreover, as hereinbefore described, the same type of radiation polymerizable compound as that used for the hard coat layer and the transparent electrically conductive layer is preferably used since the adhesion can be improved.

Furthermore, the transparent covering layer having a refractive index different from that of the transparent electrically conductive layer in the present invention has transparency and antireflection properties. This transparent covering layer is preferably made of a crosslinked polymer which is derived from a polymerizable compound having a perfluoroalkyl group and a compound mainly comprising a radiation polymerizable polyfunctional compound in order to achieve both antireflection properties and surface mechanical strength at the same time. With regard to the compound mainly comprising a radiation polymerizable polyfunctional compound, radiation polymerizable compounds such as pentaerythritol tetra(meth)acrylate, dipentaerythritol hexa(meth)acrylate and trimethylolpropane tri (meth)acrylate are preferred. The preferred transmittance of the transparent coating layer is at least 60% in the visible light range.

With regard to the polymerizable compound having a perfluoroalkyl group, the following (meth)acrylates containing a perfluoroalkyl group such as hexafluoroisopropyl acrylate, heptadecafluorodecyl acrylate, perfluoroalkylsulfonamidoethyl acrylates, perfluoroalkylamidoethyl acrylates, etc. can be cited.

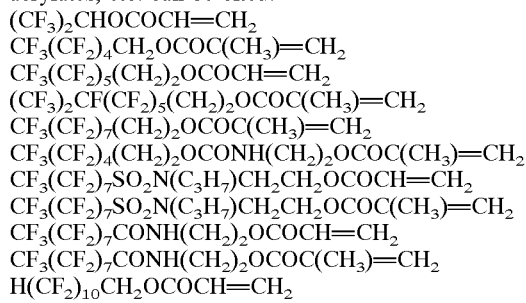

The amount of the polymerizable compound having a perfluoroalkyl group added relative to the radiation polymerizable polyfunctional compound is preferably 2 to 50 wt %, and more preferably 5 to 30 wt %. When it is less than 2 wt % the addition has no effect, and when it exceeds the above-mentioned range the strength of cured polymer is degraded.

The thickness of the transparent covering layer is preferably 50 to 100 nm, and it is desirable to set the thickness so that a reflectance-reducing effect can be obtained. The product of the refractive index and thickness (nm) of the transparent covering layer is preferably in the range from 100 to 200. The refractive index is preferably less than 1.7, and when the refractive index is more than 1.7 the reflectance becomes high and the antireflection effect is reduced.

(Anticontamination Layer)

With regard to an anticontamination layer as the outermost layer, a layer containing a known fluorine-containing compound having a low surface energy can be formed as necessary. With regard to detailed examples of the compounds having a low surface energy, silicone compounds containing a fluorinated hydrocarbon group, polymers containing a fluorinated hydrocarbon group, graft and block copolymers made from monomers having a fluorinated hydrocarbon group, silicones, etc. can be cited. They are preferably crosslinkable resins containing a thermally polymrizable or radiation polymrizable group. The contact angle of water on the surface is preferably 80° or above, and more preferably 90° or above.

The low reflection and conductive hard coat film of the present invention can be prepared by coating a coating liquid for each layer on a support by a known film coating method such as dip coating, spin coating, gravure coating, spray coating, roll coating or wire bar coating and drying. The method involving a wire bar is preferred as a method for preparing each of the layers.

The low reflection and conductive hard coat film of the present invention can be applied to a display device such as a liquid crystal display (LCD), a plasma display panel (PDP), an electroluminescent display (ELD) or a cathode ray tube display (CRT). The display device related to the present invention can be produced by bonding the transparent support side of the above-mentioned low reflection and conductive hard coat film to the display surface of the display device.

In recent years, plastic products have been replacing glass products because of their processability and low weight. However, since the surface of plastic products is easily damaged, they are used with an applied hard coat film in many cases in order to introduce antiabrasion properties. Furthermore, plastic films are increasingly applied to conventional glass products in order to prevent scattering, but since the surface hardness of a plastic film alone is insufficient a hard coat is formed on the surface thereof in many cases. It is of course possible to make the hard coat using the same composition as that of the hard coat layer of the multi-layer film of the present invention, and it is also possible to use the low reflection and conductive hard coat film of the present invention for the above-mentioned purpose. It is also possible to replace the transparent electrically conductive layer containing metal particles of the low reflection and conductive hard coat film of the present invention with a layer of oxide, etc. such as, for example, ITO to give an antireflection transparent electrically conductive film having high mechanical strength.

The hard coat film of the present invention has enhanced abrasion resistance and reduced deformation, and can give a hard coat film having excellent antireflection properties by coating. The hard coat film of the present invention formed by applying a crosslinked radiation polymerizable compound on a transparent support having a high modulus of surface elasticity has excellent surface hardness. In addition, excellent antistatic properties, electromagnetic radiation shielding properties and antireflection properties can be introduced to the low reflection and conductive hard coat film of the present invention by a simple layered structure, and the hard coat film can suitably be placed on the display surface of a cathode ray tube, plasma display, etc.

EXAMPLES

The present invention is explained further in detail by reference to the examples below, but the present invention is in no way limited thereby.

The numbers of the examples and comparative examples are denoted by 1, 11, 21, 31, etc. for convenience.

Example 1

(1) Preparation of Inorganic Particle Dispersion (M-1)

The following reagents were weighed in the amounts below into a ceramic-coated vessel.

| | |
|---|---|
| Cyclohexanone | 337 g |
| PM-2 (Methacrylate containing a phosphoric acid group, Nippon Kayaku Co., Ltd.) | 31 g |
| AKP-G015 (Alumina, Sumitomo Chemical Co., Ltd.) | 92 g |

The above-mentioned liquid mixture was finely dispersed by means of a sand mill (¼G sand mill) at 1600 rpm for 10 hours. 1400 g of 1 mmϕ zirconium oxide beads was used as a medium.

The particle size of the surface-treated aluminum oxide so obtained was 93 nm.

(2) Preparation of Coating Liquid for Hard Coat Layer 116 g of a 10 wt % methanol dispersion of the above-mentioned surface-treated aluminum oxide was mixed with 97 g of methanol, 163 g of isopropanol and 163 g of butyl acetate. 200 g of a mixture of dipentaerythritol pentaacrylate and dipentaerythritol hexaacrylate (DPHA, Nippon Kayaku Co., Ltd.) was added to the above-mentioned liquid mixture and dissolved therein. 7.5 g of a photopolymerisation initiator (Irgacure 907, Ciba-Geigy) and 5.0 g of a photosensitizer (Kayacure DETX, Nippon Kayaku Co., Ltd.) were added to the solution so obtained and dissolved therein. After stirring the mixture for 30 minutes, it was filtered using a polypropylene filter having a pore size of 1 μm to give a coating liquid for the hard coat layer.

(3) Preparation of Titanium Dioxide Dispersion 30 parts by weight of titanium dioxide (primary particle mass mean diameter: 50 nm, refractive index: 2.70), 4.5 parts by weight of an anionic diacrylate monomer (PM 21, Nippon Kayaku Co., Ltd.), 0.3 parts by weight of a cationic methacrylate monomer (DMAEA, Kojin Co., Ltd.) and 65.2 parts by weight of methyl ethyl ketone were dispersed by means of a sand grinder to give a titanium dioxide dispersion.

(4) Preparation of Coating Liquid for Medium Refractive Index Layer 0.14 g of a photopolymerization initiator (Irgacure 907, Ciba-Geigy) and 0.04 g of a photosensitizer (Kayacure DETX, Nippon Kayaku Co., Ltd.) were dissolved in 151.9 g of cyclohexanone and 37.0 g of methyl ethyl ketone. 6.1 g of the above-mentioned titanium dioxide dispersion and 2.4 g of a mixture of dipentaerythritol pentaacrylate and dipentaerythritol hexaacrylate (DPHA, Nippon Kayaku Co., Ltd.) were added thereto, and the mixture was stirred at room temperature for 30 minutes and then filtered using a polypropylene filter having a pore size of 1 μm to give a coating liquid for the medium refractive index layer.

(5) Preparation of Coating Liquid for High Refractive Index Layer 0.06 g of a photopolymerization initiator (Irgacure 907, Ciba-Geigy) and 0.02 g of a photosensitizer (Kayacure DETX, Nippon Kayaku Co., Ltd.) were dissolved in 152.8 g of cyclohexanone and 37.2 g of methyl ethyl ketone. 13.13 g of the above-mentioned titanium dioxide dispersion and 0.76 g of a mixture of dipentaerythritol pentaacrylate and dipentaerythritol hexaacrylate (DPHA, Nippon Kayaku Co., Ltd.) were added thereto, and the mixture was stirred at room temperature for 30 minutes and then filtered using a polypropylene filter having a pore size of 1 μm to give a coating liquid for the high refractive index layer.

(6) Preparation of Coating Liquid for Low Refractive Index Layer 3 g of a silane coupling agent (KBM-503, Shin-Etsu Silicone Co., Ltd.) and 2 g of 1 N hydrochloric acid were added to 200 g of a methanol dispersion of silicon dioxide fine particles having an average particle size of 15 nm (Methanol Silica Sol, Nissan Chemical Industries, Ltd.), and the mixture was stirred at room temperature for 5 hours and then allowed to stand for 3 days to give a dispersion of silanized silicon dioxide fine particles.

58.35 g of isopropyl alcohol and 39.34 g of diacetone alcohol were added to 35.04 g of the above-mentioned dispersion. 1.02 g of a photopolymerization initiator (Irgacure 907, Ciba-Geigy) and 0.51 g of a photosensitizer (Kayacure DETX, Nippon Kayaku Co., Ltd.) were dissolved in 772.85 g of isopropyl alcohol, and 25.6 g of a mixture of dipentaerythritol pentaacrylate and dipentaerythritol hexaacrylate (DPHA, Nippon Kayaku Co., Ltd.) was further added thereto and dissolved therein. 67.23 g of the solution so obtained was added to the above-mentioned mixture of the dispersion, isopropyl alcohol and diacetone alcohol. The mixture was stirred at room temperature for 20 minutes and then filtered using a polypropylene filter having a pore size of 1 μm to give a coating liquid for the low refractive index layer.

(7) Preparation of Coating Liquid for Overcoat Layer

A thermally crosslinkable fluorine-containing polymer (JN-7214, JSR Co., Ltd.) was added to isopropyl alcohol to give a 0.6 wt % coarse dispersion. The coarse dispersion was finely dispersed by means of ultrasound to give a coating liquid for the overcoat layer.

(8) Preparation of Hard Coat Film Having Antireflection Properties

A gelatin undercoat layer was provided on a triacetyl cellulose film having a thickness of 80 μm (TAC-TD80U, Fuji Photo Film Co., Ltd., refractive index: 1.48). The above-mentioned coating liquid for the hard coat layer was coated on the gelatin undercoat layer using a bar coater, dried at 120° C. and then irradiated with ultraviolet radiation so as to polymerize the coated layer to give a hard coat layer having a thickness of 9.0 μm.

The above-mentioned coating liquid for the medium refractive index layer was coated on the hard coat layer using a bar coater, dried at 120° C. and then irradiated with ultraviolet radiation so as to cure the coated layer to give a medium refractive index layer (refractive index: 1.72, thickness: 0.081 μm).

The above-mentioned coating liquid for the high refractive index layer was coated on the medium refractive index layer using a bar coater, dried at 120° C. and then irradiated with ultraviolet radiation so as to polymerize the coated layer to give a high refractive index layer (refractive index: 1.92, thickness: 0.053 μm).

The above-mentioned coating liquid for the low refractive index layer was coated on the high refractive index layer using a bar coater, dried at 120° C. and then irradiated with ultraviolet radiation so as to polymerize the coated layer to give a low refractive index layer (refractive index: 1.40, thickness: 0.072 μm). The porosity of the low refractive index layer so formed was 16 vol %.

The above-mentioned coating liquid for the overcoat layer was coated on the low refractive index layer using a #3 wire bar and dried at 120° C. for 1 hour to give a hard coat film having antireflection properties.
(Evaluation of the Hard Coat Film Having Antireflection Properties)

The following characteristics of the hard coat film having antireflection properties obtained above were evaluated. The results are given in Table 1.
(1) Abrasion Resistance The hard coat film having antireflection properties was conditioned at 25° C. and 60% RH for 2 hours and then subjected to a pencil hardness test according to JIS-K-5400 using a test pencil according to JIS-S-6006 with a load of 1 kg to find the hardness at which no damage was observed.
(2) Curl Value The hard coat film having antireflection properties was cut into a sample size of 35 mm×3 mm, clamped between boards for reading the F type curl value and conditioned at 25° C. and 60% RH for 30 minutes, and the curl value was read off.

Example 2

The following reagents were weighed in the amounts below into a ceramic-coated vessel.

| | |
|---|---|
| Cyclohexanone | 337 g |
| Aluminum-containing compound (a-3) | 31 g |
| AKP-G015 (Alumina, Sumitomo Chemical Co., Ltd.) | 92 g |

The above-mentioned liquid mixture was finely dispersed by means of a sand mill (¼G sand mill) at 1600 rpm for 10 hours. 1400 g of 1 mmφ zirconium oxide beads was used as a medium.

0.1 g of 1N hydrochloric acid was added thereto, and the mixture was heated to 60° C. under an atmosphere of nitrogen. The mixture was stirred for a further 4 hours.

The particle size of the surface-treated aluminum oxide so obtained was 72 nm.

A hard coat film having antireflection properties was prepared in the same manner as in Example 1 except that the aluminum oxide obtained above was used.

Example 3

The following reagents were weighed in the amounts below into a ceramic-coated vessel.

| | |
|---|---|
| Cyclohexanone | 337 g |
| Titanium-containing compound (c-4) | 31 g |
| TTO-55B (Titanium oxide fine particles, Ishihara Sangyo Kaisha, Ltd.) | 92 g |

The above-mentioned liquid mixture was finely dispersed by means of a sand mill (¼G sand mill) at 1600 rpm for 6 hours. 1400 g of 1 mmφ zirconium oxide beads was used as a medium. 0.1 g of 1N hydrochloric acid was added thereto, and the mixture was heated to 80° C. under an atmosphere of nitrogen. The mixture was stirred for a further 4 hours.

The particle size of the surface-treated titanium oxide so obtained was 32 nm.

A hard coat film having antireflection properties was prepared in the same manner as in Example 1 except that the titanium oxide obtained above was used.

Comparative Example 1

125 g of a mixture of dipentaerythritol pentaacrylate and dipentaerythritol hexaacrylate (DPHA, Nippon Kayaku Co., Ltd.) and 125 g of a urethane acrylate oligomer (UV-6300B, The Nippon Synthetic Chemical Industry Co., Ltd.) were dissolved in 450 g of industrial grade denatured ethanol. The solution so obtained was mixed with a solution obtained by dissolving 7.5 g of a photopolymerisation initiator (Irgacure 907, Ciba-Geigy) and 5.0 g of a photosensitizer (Kayacure DETX, Nippon Kayaku Co., Ltd.) in 47.5 g of methyl ethyl ketone. After stirring the mixture, it was filtered using a polypropylene filter having a pore size of 1 μm to give a coating liquid for the hard coat layer.

A hard coat film having antireflection properties was prepared in the same manner as in Example 1 except that the coating liquid for the hard coat layer prepared above was used, and the film was evaluated.

Comparative Example 2

88 g of methanol, 163 g of isopropanol and 163 g of butyl acetate were added to 125 g of a 40 wt % methanol dispersion of AKP-G015 aluminum oxide fine particles (without surface treatment). 200 g of a mixture of dipentaerythritol pentaacrylate and dipentaerythritol hexaacrylate (DPHA, Nippon Kayaku Co., Ltd.) was added to the above-mentioned liquid mixture and dissolved therein. 7.5 g of a photopolymerisation initiator (Irgacure 907, Ciba-Geigy) and 5.0 g of a photosensitizer (Kayacure DETX, Nippon Kayaku Co., Ltd.) were added to the solution so obtained and dissolved. After stirring the mixture for 30 minutes, it was filtered using a polypropylene filter having a pore size of 1 μm to give a coating liquid for the hard coat layer.

A hard coat film having antireflection properties was prepared in the same manner as in Example 1 except that the coating liquid for the hard coat layer prepared above was used, and the film was evaluated.

TABLE 1

Results of evaluation of hard coat film having antireflection properties

| Hard coat film having antireflection properties | Abrasion resistance | Curl Value | Notes |
|---|---|---|---|
| Example 1 | 3H | 0.6 | |
| Example 2 | 2H | 0.4 | |
| Example 3 | 3H | 0.7 | |
| Comparative Example 1 | 2H | 2.1 | |
| Comparative Example 2 | HB | 1.4 | Cracks in coating |

Examples 11-1 to 11-10
(1) Polyester Polymerization
  (a) Poly(ethylene terephthalate) (PET)

80 parts of dimethyl terephthalate, 58 parts of ethylene glycol, 0.029 parts of manganese acetate tetrahydrate and 0.028 g of antimony trioxide were mixed and heated to 200° C. while stirring. The mixture was further heated to 235° C. while removing the methanol formed as a by-product. After the formation of methanol was complete, 0.03 parts of trimethyl phosphate was added thereto, and the mixture was heated to 285° C. while evacuating to 0.3 Torr and polymerized to give PET having an intrinsic viscosity of 0.62 dl/g.

(b) Poly(ethylene naphthalate) (PEN)

100 parts of naphthalenedicarboxylic acid dimethyl ester, 58 parts of ethylene glycol, 0.029 parts of manganese acetate tetrahydrate and 0.028 g of antimony trioxide were mixed and heated to 200° C. while stirring. The mixture was further heated to 235° C. while removing the methanol formed as a by-product. After the formation of methanol was complete, 0.03 parts of trimethyl phosphate was added thereto, and the mixture was heated to 285° C. while evacuating to 0.3 Torr and polymerized to give PEN having an intrinsic viscosity of 0.58 dl/g.

The intrinsic viscosity was measured by the following method.

1) The polyester was dissolved in a solvent mixture of phenol/1,1,2,2-tetrachloroethane (ratio by weight: 60/40) to give 0.2 g/dl, 0.6 g/dl and 1.0 g/dl solutions.

2) The viscosity of the solutions was measured at 20° C. using an Ubbelohde viscometer.

3) The viscosity was plotted relative to the concentration and the intrinsic viscosity was determined by extrapolating the viscosity to a concentration of 0.

(2) Kneading of Fine Particles

A PET oligomer was prepared by shortening the polymerization time in the above-mentioned method so as to give the intrinsic viscosity in dl/g units described in Table 2. This was added to the fine particles as shown in Table 2. The mixture was kneaded at 230° C. for 5 minutes using a Banbury mixer.

The above-mentioned PET having an intrinsic viscosity of 0.62 dl/g and PEN having an intrinsic viscosity of 0.58 dl/g were dried at 150° C. for 30 minutes and then kneaded using a mono screw kneader-extruder for 5 minutes while heating from 280° C. to 320° C. The sample was extruded in the form of strands, cooled with water and cut into pellets.

TABLE 2

Dispersion of fine particles in polyester

| Pellets | polyester | Fine Particle Type | Size (nm) | Oligomer Intrinsic viscosity (dl/g) | Fine particle content (%) |
|---|---|---|---|---|---|
| Pellets 1 | PET | Aluminum oxide | 40 | 0.1 | 20 |
| Pellets 2 | PET | Aluminum oxide | 40 | 0.1 | 40 |
| Pellets 3 | PET | Titanium oxide | 50 | 0.1 | 30 |
| Pellets 4 | PET | None | — | — | — |
| Pellets 5 | PEN | Aluminum oxide | 40 | 0.08 | 20 |
| Pellets 6 | PEN | Aluminum oxide | 40 | 0.08 | 40 |
| Pellets 7 | PEN | Titanium oxide | 50 | 0.08 | 30 |
| Pellets 8 | PEN | None | — | — | — |

(3) Formation of Polyester Film

The polyester pellets prepared by the above-mentioned method were dried at 160° C. at a reduced pressure for 3 hours. Pellets having these compositions were melted at 310° C., filtered through a 5 μm mesh filter and extruded through a T die (multimanifold die) using an extruder onto an electrostatically charged casting drum at 50° C. to give unstretched films with the compositions shown in Table 3.

These films were subjected to MD stretching (ratio 3.5 times, 105° C.), TD stretching (4.0 times, 110° C.), thermal fixation (245° C.) and thermal relaxation (3%) under the conditions shown in Table 3. The manufactured film width of all samples were 1.8 m, both edges of the film were trimmed to give a width of 1.5 m, both edges were subjected to knurling to a height of 30 μm and a width of 10 mm, and the films were then wound up in lengths of 3000 m around cores having a diameter of 30 cm.

TABLE 3

Film formation conditions and surface elasticity of polyesters

| Support film | Pellet composition | | Film thickness layer A/layer B | Elasticity GPa |
|---|---|---|---|---|
| | Layer B | Layer A | | |
| Film 1 | Pellets 1 | Pellets 4 | 30/150 | 6.5 |
| Film 2 | Pellets 2 | Pellets 4 | " | 8.0 |
| Film 3 | Pellets 3 | Pellets 4 | " | 7.5 |
| Film 4 | Pellets 4 | Pellets 4 | 175 | 4.3 |
| Film 5 | Pellets 5 | Pellets 8 | 30/150 | 7.5 |
| Film 6 | Pellets 6 | Pellets 8 | " | 9.0 |
| Film 7 | Pellets 7 | Pellets 8 | " | 8.5 |
| Film 8 | Pellets 8 | Pellets 8 | 175 | 5.1 |

(4) Preparation of Inorganic Particle Dispersion (M-1)

The following reagents were weighed in the amounts below into a ceramic-coated vessel.

| | |
|---|---|
| Cyclohexanone | 337 g |
| PM-2 (Methacrylate containing a phosphoric acid group, Nippon Kayaku Co., Ltd.) | 31 g |
| AKP-G015 (Alumina, Sumitomo Chemical Co., Ltd., particle size 15 nm) | 92 g |

The above-mentioned liquid mixture was finely dispersed by means of a sand mill (¼G sand mill) at 1600 rpm for 10 hours. 1400 g of 1 mmφ zirconium oxide beads was used as a medium. After the dispersion, the beads were removed to give a surface-treated aluminum oxide (M-1).

(5) Preparation of Coating Liquid for Hard Coat Layer 116 g of a 43 wt % cyclohexanone dispersion of the above-mentioned surface-treated aluminum oxide (M-1) was mixed with 97 g of methanol, 163 g of isopropanol and 163 g of methyl isobutyl ketone. 200 g of a mixture of dipentaerythritol pentaacrylate and dipentaerythritol hexaacrylate (DPHA, Nippon Kayaku Co., Ltd.) was added to the above-mentioned liquid and dissolved therein. 7.5 g of a photopolymerisation initiator (Irgacure 907, Ciba-Geigy) and 5.0 g of a photosensitizer (Kayacure DETX, Nippon Kayaku Co., Ltd.) were added to the solution so obtained and dissolved therein. After stirring the mixture for 30 minutes, it was filtered using a polypropylene filter having a pore size of 1 μm to give a coating liquid for the hard coat layer.

(6) Preparation of Hard Coat Film

After subjecting the support films described in Table 4 to a glow discharge treatment, the coating liquid for the hard coat layer filled with aluminum oxide was coated thereon by a wire bar, dried and irradiated with ultraviolet radiation to form a hard coat layer having a dry thickness of 8 μm onto the support film. The hardness was examined by the pencil hardness test.

The hardness by the pencil hardness test was determined by conditioning the hard coat film so prepared at 25° C. and 60% RH for 2 hours and then subjecting it to the pencil hardness test according to JIS-K-5400 using a test pencil according to JIS-S-6006 with a load of 1 kg to find the hardness of pencil at which no damage was observed.

TABLE 4

Composition of hard coat film and surface hardness

| Hard coat film | Support film | Particles in hard coat layer | Pencil hardness |
|---|---|---|---|
| Example 11-1 | Film 1 | Aluminum oxide | 5H |
| Example 11-2 | Film 2 | Aluminum oxide | 6H |
| Example 11-3 | Film 3 | Aluminum oxide | 5H |
| Example 11-4 | Film 1 | None | 4H |
| Example 11-5 | Film 4 | None | 3H |
| Example 11-6 | Film 5 | Aluminum oxide | 6H |
| Example 11-7 | Film 6 | Aluminum oxide | 6H |
| Example 11-8 | Film 7 | Aluminum oxide | 6H |
| Example 11-9 | Film 5 | None | 5H |
| Example 11-10 | Film 8 | None | 4H |

Examples 21-1 to 21-11

(1) Preparation of Coating Liquid for Hard Coat Layer (Preparation of Dispersion of Surface-Treated Aluminum Oxide (M-1))

The following reagents were weighed in the amounts below into a ceramic-coated vessel.

| | |
|---|---|
| Cyclohexanone | 337 g |
| M-5300 (Acrylate containing carboxylic acid, Toagosei Co., Ltd.) | 31 g |
| AKP-G015 (Alumina, Sumitomo Chemical Co., Ltd., particle size 15 nm) | 92 g |

The above-mentioned liquid mixture was finely dispersed by means of a sand mill at 1600 rpm for 10 hours. 1400 g of 1 mmϕ zirconium oxide beads was used as a medium.

(Preparation of Coating Liquid for Hard Coat Layer)

116 g of a 43 wt % cyclohexanone dispersion of the surface-treated aluminum oxide fine particles was mixed with 97 g of methanol, 163 g of isopropanol and 163 g of methyl isobutyl ketone. 200 g of a mixture of dipentaerythritol pentaacrylate and dipentaerythritol hexaacrylate (DPHA, Nippon Kayaku Co., Ltd.) was added to the above-mentioned liquid mixture and dissolved therein. 7.5 g of a photopolymerisation initiator (Irgacure 907, Ciba-Geigy) and 5.0 g of a photosensitizer (Kayacure DETX, Nippon Kayaku Co., Ltd.) were added to the solution so obtained and dissolved therein. After stirring the mixture for 30 minutes, it was filtered using a polypropylene filter having a pore size of 1 μm to give a coating liquid for the hard coat layer.

(2) Preparation of Silver Colloid Coating Liquid (Preparation of Silver Colloid Dispersion)

30% iron (II) sulfate ($FeSO_4 7H_2O$) and 40% citric acid were prepared and mixed, a 10% solution of silver nitrate was added thereto while maintaining the temperature at 5° C., the mixture was washed with water by centrifugation, and pure water was added thereto to give a 3 wt % silver colloid dispersion. It was found by TEM that the particle size of the silver colloid particles so obtained was about 9 to 12 nm.

(Preparation of Silver Colloid Coating Liquid)

Isopropyl alcohol was added to 100 g of the above-mentioned silver colloid dispersion, and the mixture was dispersed by means of ultrasound and filtered using a polypropylene filter having a pore size of 1 μm to give a coating liquid.

(3) Preparation of Coating Liquid for Antireflection Layer 2 g of a mixture of dipentaerythritol pentaacrylate and dipentaerythritol hexaacrylate (DPHA, Nippon Kayaku Co., Ltd.), 80 mg of a photopolymerisation initiator (Irgacure 907, Ciba-Geigy), 30 mg of a photosensitizer (Kayacure DETX, Nippon Kayaku Co., Ltd.) and the additives described in Table 5 were added to a mixed solvent of 50 g of methyl isobutyl ketone and 50 g of 2-butyl alcohol and dissolved therein. After stirring the mixture for 30 minutes, it was filtered using a polypropylene filter having a pore size of 1 μm to give a coating liquid for the antireflection layer (A).

(4) Preparation of Coating Liquid for Anticontamination Layer

Isopropyl alcohol was added to a thermally crosslinkable fluorine-containing polymer (JN-7214, JSR Co., Ltd.) to give a 0.2 wt % coarse dispersion. The coarse dispersion was further dispersed by ultrasound to give a coating liquid for the anticontamination layer.

Examples 21-1 to 21-8

The coating liquid for the hard coat layer was coated on a 175 μm thick poly(ethylene terephthalate) film using a wire bar, dried and irradiated with ultraviolet radiation to give a hard coat layer having a dry layer thickness of 8 μm. After subjecting it to a corona treatment, 70 mg/m$^2$ of the above-mentioned silver colloid coating liquid was coated thereon using a wire bar and dried at 40° C. The surface coated with the silver colloid was sprayed with water fed by a pump, the excess water was removed by means of an air knife, and the film was fed through a heating zone at 120° C. with a residence time of 5 minutes. Subsequently, each of the coating liquids for the antireflection layer was coated thereon, dried and irradiated with ultraviolet to give a low reflection and conductive hard coat film having a dry film thickness of 85 nm.

Examples 21-9

A low reflection and conductive hard coat film was prepared in the same manner as in Example 21-4. Subsequently, each of the coating liquids for the anticontamination layer was coated thereon, dried and heated at 120° C. for 10 minutes to give a low reflection and conductive hard coat film with an anticontamination layer having a dry film thickness of 5 nm.

Examples 21-10 and 21-11

Low reflection and conductive hard coat films were prepared in the same manner as in Examples 21-4 and 21-9 except that a coating liquid for the antireflection layer without any additive was used.

The results from measurement of the characteristics of the low reflection and conductive hard coat films so prepared are given in Table 5.

TABLE 5

| Film | Additive | Amount added (wt %) | Surface resistivity (Ω/□) | Transmittance (%) | Average reflectance (%) | Abrasion resistance | Contact angle resistance (°) | Contamination |
|---|---|---|---|---|---|---|---|---|
| Ex. 21-1 | A | 2 | 300 | 68 | 0.8 | ** | 94 | *** |
| Ex. 21-2 | A | 5 | 300 | 67 | 0.8 | ** | 100 | *** |
| Ex. 21-3 | A | 10 | 300 | 64 | 0.8 | *** | 106 | *** |
| Ex. 21-4 | A | 20 | 310 | 66 | 0.8 | *** | 108 | *** |
| Ex. 21-5 | A | 30 | 320 | 68 | 0.8 | *** | 110 | *** |
| Ex. 21-6 | A | 50 | 300 | 65 | 0.8 | *** | 110 | *** |
| Ex. 21-7 | B | 20 | 310 | 64 | 0.8 | *** | 104 | *** |
| Ex. 21-8 | C | 20 | 310 | 63 | 0.8 | *** | 105 | *** |
| Ex. 21-9 | A | 20 | 340 | 63 | 0.9 | *** | 100 | *** |
| Ex. 21-10 | None | 0 | 300 | 65 | 0.8 | * | 68 | ** |
| Ex. 21-11 | None | 0 | 350 | 65 | 0.9 | * | 104 | *** |

Compound A: $CF_3(CF_2)_7SO_2N(C_3H_7)CH_2CH_2OCOC(CH_3)=CH_2$
Compound B: $CF_3(CF_2)_7(CH_2)_2OCOC(CH_3)=CH_2$
Compound C: $CF_3(CF_2)_5(CH_2)_2OCOCH=CH_2$ The respective characteristics were measured as follows.
Evaluation of Low Reflection and Conductive Hard Coat Film (1) Surface Resistivity Measured using a four-point surface resistivity meter ('Loresta FP', Mitsubishi Chemical Corp.).

(2) Transmittance

Average transmittance over the wavelength range from 400 to 800 nm using a spectrophotometer (UV-2400PC, Shimadzu Corp.).

(3) Average Reflectance

Average reflectance of positive reflection at an incident angle at 5° in the wavelength range from 450 to 650 nm measured using a spectrophotometer (JASCO Corporation)

(4) Abrasion Resistance

Evaluated by scratching for 50 cycles using #0000 steel wool with a load of 200 g/cm² (*: no visible scratches, : only a few fine scratches observed, *: many fine scratches observed)

(5) Contact Angle

After conditioning the film at 25° C. and 60% RH for 2 hours, the contact angle of water was measured using a contact angle measuring device (Kyowa Kaimen Kagaku Co., Ltd.).

(6) Contamination Resistance

The film surface was marked with finger prints, and the surface was rubbed off a few times using Toraysee made by Toray (*: finger prints completely cleaned, : part of finger prints remained uncleaned).

It can be understood from Table 5 that the abrasion resistance was improved of the surface of the low reflection and conductive hard coat films on which the silver colloid layer and antireflection layer containing a polymerizable compound having a perfluoroalkyl group were applied on the support provided with the hard coat layer. Furthermore, they had excellent transparency, conductivity, antireflection properties and contamination resistance.

Example 31

(1) Preparation of Inorganic Particle Dispersion (M-1)

The following reagents were weighed in the amounts below into a ceramic-coated vessel.

| | |
|---|---|
| Cyclohexanone | 337 g |
| PM-2 (methacrylate containing phosphoric acid (d-1), Nippon Kayaku Co., Ltd.) | 31 g |
| AKP-G015 (Alumina, Sumitomo Chemical Co. Ltd., particle size 15 nm) | 92 g |

The above-mentioned liquid mixture was finely dispersed by means of a sand mill at 1600 rpm for 10 hours. 1400 g of 1 mmφ zirconium oxide beads was used as a medium.

(2) Preparation of Coating Liquid for Hard Coat Layer 116 g of a 43 wt % cyclohexanone dispersion of the surface-treated aluminum oxide fine particles was mixed with 97 g of methanol, 163 g of isopropanol and 163 g of methyl isobutyl ketone. 200 g of a mixture of dipentaerythritol pentaacrylate and dipentaerythritol hexaacrylate (DPHA, Nippon Kayaku Co., Ltd.) was added to the above-mentioned liquid mixture and dissolved therein. 7.5 g of a photopolymerisation initiator (Irgacure 907, Ciba-Geigy) and 5.0 g of a photosensitizer (Kayacure DETX, Nippon Kayaku Co., Ltd.) were added to the solution so obtained and dissolved therein. After stirring the mixture for 30 minutes, it was filtered using a polypropylene filter having a pore size of 1 μm to give a coating liquid for the hard coat layer.

(3) Preparation of Silver-palladium Colloid Dispersion

30% iron (II) sulfate ($FeSO_4 7H_2O$) and 40% citric acid were prepared and mixed, a 10% solution of silver nitrate and palladium nitrate (molar ratio of 9/1) was added thereto at 200 ml/min. while maintaining the mixture at 20° C. and stirring, the mixture was repeatedly washed with water by centrifugation, and pure water was added thereto to give a 3 wt % silver-palladium colloid dispersion. It was found by TEM that the particle size of the silver-palladium colloid particles so obtained was about 9 to 12 nm. Measurement by ICP showed that the ratio of silver to palladium was 9/1, which was the same as that at which they were added.

(4) Preparation of Coating Liquid for Transparent Electrically Conductive Layer 2 g of a mixture of pentaerythritol tetraacrylate and pentaerythritol triacrylate (PETA, Nippon Kayaku Co., Ltd.), 80 mg of a photopolymerisation initiator (Irgacure 907, Ciba-Geigy), and 30 mg of a photosensitizer (Kayacure DETX, Nippon Kayaku Co., Ltd.) were added to a mixed solvent of 38 g of methyl isopropyl ketone, 38 g of 2-butanol and 19 g of methanol and dissolved therein. The above-mentioned silver-palladium colloid dispersion was added thereto so that the ratio by volume relative to the silver-palladium was 5%. It was filtered using a polypropylene filter having a pore size of 1 $\mu$m to give a coating liquid for the transparent electrically conductive layer.

(5) Preparation of Coating Liquid for Antireflection Layer 2 g of a mixture of dipentaerythritol pentaacrylate and dipentaerythritol hexaacrylate (DPHA, Nippon Kayaku Co., Ltd.), 80 mg of a photopolymerisation initiator (Irgacure 907, Ciba-Geigy), and 30 mg of a photosensitizer (Kayacure DETX, Nippon Kayaku Co., Ltd.) were added to a mixed solvent of 38 g of methyl isopropyl ketone, 38 g of 2-butanol and 19 g of methanol and dissolved therein. After stirring the mixture for 30 minutes, it was filtered using a polypropylene filter having a pore size of 1 $\mu$m to give a coating liquid for the antireflection layer.

(6) Preparation of Coating Liquid for Anticontamination Layer

Isopropyl alcohol was added to a thermally crosslinkable fluorine-containing polymer (JN-7214, JSR Co., Ltd.) to give a 0.2 wt % coarse dispersion. The coarse dispersion was further dispersed by ultrasound to give a coating liquid for the anticontamination layer.

(7) Formation of Low Reflection and Conductive Hard Coat Film

The coating liquid for the hard coat layer was coated on a 188 $\mu$m thick poly(ethylene terephthalate) film using a wire bar, dried and irradiated with ultraviolet radiation to give a hard coat layer having a dry layer thickness of 8 $\mu$m. After subjecting it to a corona treatment, 70 mg/m$^2$ of the above-mentioned coating liquid for the transparent electrically conductive layer was coated using a wire bar and dried at 40° C. The coated surface of the transparent electrically conductive layer was sprayed with water fed by a pump, the excess water was removed by means of an air knife, and the film was fed through a heating zone at 120° C. with a residence time of 5 minutes. Subsequently, an antireflection layer was coated thereon with a film thickness of 80 nm, dried and irradiated with ultraviolet radiation. Furthermore, 5 mg/m$^2$ of the coating liquid for the anticontamination layer was coated using a wire bar, dried at 120° C. and heated in the same manner to give a low reflection and conductive hard coat film.

Example 32

The procedure of Example 31 was repeated except that the amount of radiation polymerizable compound in the transparent electrically conductive layer was changed to 40 vol % to give a low reflection and conductive hard coat film.

Example 33

The procedure of Example 32 was repeated except that a mixture of dipentaerythritol pentaacrylate and dipentaerythritol hexaacrylate (DPHA, Nippon Kayaku Co., Ltd.) was used as a radiation polymerizable compound in the transparent electrically conductive layer instead of a mixture of pentaerythritol tetraacrylate and pentaerythritol triacrylate (PETA, Nippon Kayaku Co., Ltd.) to give a low reflection and conductive hard coat film.

Comparative Example 31

The procedure of Example 31 was repeated except that a radiation polymerizable compound was not added to the transparent electrically conductive layer to give a low reflection and conductive hard coat film.

Comparative Example 32

The procedure of Example 31 was repeated except that the amount of radiation polymerizable compound in the transparent electrically conductive layer was changed to 70 vol % relative to the silver to give a low reflection and conductive hard coat film.

The respective characteristics were measured as follows.
(Evaluation of Low Reflection and Conductive Hard Coat Films)
(1) Surface Resistivity Measured using a four-point surface resistivity meter ('Loresta FP', Mitsubishi Chemical Corp.).
(2) Average Reflectance Average reflectance of positive reflection at an incident angle at 5° in the wavelength range from 450 to 650 nm measured using a spectrophotometer (JASCO Corporation)
(3) Hardness by Pencil Scratch Test The film was conditioned at 25° C. and 60% RH for 2 hours and then subjected to a pencil hardness test according to JIS-K-5400 using a test pencil according to JIS-S-6006 with a load of 1 kg to find the hardness at which no damage was observed.
(4) Abrasion Resistance After conditioning the film at 25° C. and 60% RH for 2 hours, evaluated by scratching a contact area of 1 cm$^2$ for 50 cycles using #0000 steel wool with a load of 200 g/cm$^2$. (*: no visible scratches, : only a few fine scratches observed, *: apparent scratches observed)
(5) Adhesion After conditioning the film at 25° C. and 60% RH for 2 hours, the surface was cut with a cutter knife so as to make 10×10 squares and peeled off using polyester tape, and the surface was examined and evaluated using the criteria below.

***: No peel off.
**: Slight peel off at the edges.
*: Significant peel off observed.
The results are given in Table 6.

TABLE 6

|  | Surface resistance | Pencil hardness | Abrasion resistance | Adhesion | Reflectance |
|---|---|---|---|---|---|
| Example 31 | 350 | 3H | to* | to* | 0.9 |
| Example 32 | 420 | 4H | * | to*** | 1.0 |
| Example 33 | 410 | 4H | *** | *** | 1.0 |
| Example 34 | 310 | 3H | * | * | 0.8 |
| Example 35 | 27000 | 4H | * | to*** | 3.8 |

It can be understood from Table 6 that a coating having improved pencil hardness, adhesion and abrasion resistance can be obtained by forming the transparent electrically conductive layer from metal fine particles and a radiation polymerizable compound and setting the amount of radiation polymerizable compound in the range from 2 to 70 vol % relative to the metal particles. It can be also understood that the hard coat film having low reflectance, transparency and conductivity and comprising, on the above-mentioned hard transparent electrically conductive layer, an antireflection layer and an anticontamination layer has excellent conductivity, antireflection properties and contamination resistance and excellent mechanical characteristics.

What is claimed is:

1. A hard coat film comprising:

a transparent support; and a hard coat layer thereon;

the hard coat layer containing surface-treated inorganic fine particles and a crosslinked binder polymer;

the surface treatment being carried out using, as a surface treatment agent, an organic compound containing an anionic functional group and a polymerizable vinyl group;

the binder polymer being formed by crosslinking a radiation polymerizable compound; and wherein the surface treatment is carried out by using a sand mill to obtain a dispersion of the inorganic fine particles, the surface treatment agent and the radiation polymerizable compound.

2. The hard coat film according to claim 1 wherein the surface treatment agent is an organic compound having a phosphoric acid group, phosphoric ester group, sulfonic acid group, sulfuric ester group or carboxy group.

3. The hard coat film according to claim 1 wherein the surface treatment agent is an organic compound selected from the group consisting of a compound containing a carbonic acid group, a monoester of phosphoric acid, a diester of phosphoric acid, salts thereof, and acid halides thereof.

4. The hard coat film according to claim 1 wherein the inorganic fine particles have a Mohs hardness of at least 6 and a particle size of 1 nm to 400 nm.

5. The hard coat film according to claim 1 wherein the inorganic fine particles comprise particles containing at least one compound selected from the group consisting of silicon dioxide, zirconium oxide, aluminum oxide and titanium dioxide.

6. The hard coat film according to claim 1 wherein the inorganic fine particles comprise particles containing aluminum oxide.

7. The hard coat film according to claim 1 wherein the hard coat layer has a thickness of 5 $\mu$m to 15 $\mu$m.

8. The hard coat film according to claim 1 wherein the transparent support is a polyester film having a modulus of surface elasticity of at least one side thereof of 5 GPa to 15 GPa.

9. The hard coat film according to claim 8 wherein the transparent support is a polyester film containing 10 wt % to 60 wt % of fine particles having a particle size of 1 nm to 400 nm.

10. The hard coat film according to claim 8 wherein the transparent support is a film formed by co-extruding a layer (layer B) containing 10 wt % to 60 wt % of fine particles having a particle size of 1 nm to 400 nm on at least one side of a polyester support (layer A).

11. The hard coat film according to claim 10 wherein the total thickness of the transparent support film is 50 $\mu$m to 300 $\mu$m and the thickness of layer B is 10 $\mu$m to 100 $\mu$m.

12. The hard coat film according to claim 8 wherein the polyester film is formed from a poly(ethylene terephthalate) resin or a poly(ethylene naphthalate) resin.

13. The hard coat film according to claim 1 having antireflection properties wherein a medium refractive index layer having a refractive index which is higher than that of the transparent support, a high refractive index layer having a refractive index which is higher than either that of the transparent support or that of the medium refractive index layer, and a low refractive index layer having a refractive index which is lower than that of the transparent support are applied in that order on the hard coat layer.

14. A display device wherein a hard coat film having antireflection properties according to claim 13 is formed on the display surface thereof.

15. The low reflection and electrically conductive hard coat film according to claim 1 further comprising:

a transparent electrically conductive layer containing particles comprising at least one type of metal; and a transparent covering layer being formed as an outer layer to the transparent electrically conductive layer and having a refractive index different from that of the transparent electrically conductive layer;

the transparent covering layer containing a polymer derived from a compound mainly comprising a radiation polymerizable polyfunctional compound and a polymerizable compound having a perfluoroalkyl group.

16. The hard coat film according to claim 15 wherein the particles comprising at least one type of metal are silver or an alloy mainly comprising silver.

17. The hard coat film according to claim 15 wherein the particles comprising at least one type of metal have a particle size of 1 nm to 100 nm.

18. The hard coat film according to claim 15 further comprising a layer containing fluorine and/or a silicone being formed outside the transparent covering layer.

19. The hard coat film according to claim 1 further comprising, outside the hard coat layer:

a transparent electrically conductive layer formed from a cured mixture of fine particles comprising at least one type of metal and a radiation polymerizable compound;

at least one transparent antireflection layer being formed as an outer layer to the transparent electrically conductive layer and having a refractive index different from that of the transparent electrically conductive layer; and an anticontamination layer formed as the outermost layer;

the hard coat film having transparency and electrical conductivity.

20. The hard coat film according to claim 19 wherein the antireflection layer is formed by polymerizing and crosslinking a radiation polymerizable compound.

21. The hard coat film according to claim 19 wherein the amount of radiation polymerizable polyfunctional compound present in the transparent electrically conductive layer is in the range from 2 to 70 vol % relative to the metal particles.

22. The hard coat film according to claim 19 wherein the hard coat layer, transparent electrically conductive layer and antireflection layer comprise the same radiation polymerizable polyfunctional compound.

23. The hard coat film according to claim 19 wherein the anticontamination layer comprises an organic compound containing a fluorine atom.

24. The hard coat film according to claim 1, wherein the crosslinked binder polymer is derived from polymerizable polyfunctional compounds.

* * * * *

UNITED STATES PATENT AND TRADEMARK OFFICE
CERTIFICATE OF CORRECTION

PATENT NO.     : 6,686,031 B2
DATED          : February 3, 2004
INVENTOR(S)    : Akihiro Matsufuji et al.

It is certified that error appears in the above-identified patent and that said Letters Patent is hereby corrected as shown below:

<u>Title page,</u>
Item [73], Assignee, change "Ninamiashigara" to -- Minamiashigara --.

Signed and Sealed this

Seventeenth Day of August, 2004

JON W. DUDAS
*Acting Director of the United States Patent and Trademark Office*